(12) United States Patent
Oyama et al.

(10) Patent No.: US 12,451,011 B2
(45) Date of Patent: Oct. 21, 2025

(54) TRAVELING CONTROL SYSTEM FOR VEHICLES

(71) Applicant: SUBARU CORPORATION, Tokyo (JP)

(72) Inventors: Hajime Oyama, Tokyo (JP); Masato Mizoguchi, Tokyo (JP); Ryosuke Namba, Tokyo (JP); Hiroaki Kawamura, Tokyo (JP); Norikazu Ebisawa, Tokyo (JP); Kengo Kobayashi, Tokyo (JP); Masaru Nakanishi, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 227 days.

(21) Appl. No.: 18/269,844

(22) PCT Filed: Dec. 24, 2021

(86) PCT No.: PCT/JP2021/048277
§ 371 (c)(1),
(2) Date: Jun. 27, 2023

(87) PCT Pub. No.: WO2022/145378
PCT Pub. Date: Jul. 7, 2022

(65) Prior Publication Data
US 2024/0071223 A1    Feb. 29, 2024

(30) Foreign Application Priority Data
Dec. 28, 2020   (JP) .................. 2020-218968

(51) Int. Cl.
*G08G 1/096*   (2006.01)
*B60W 60/00*   (2020.01)
*G08G 1/0967*  (2006.01)

(52) U.S. Cl.
CPC ..... *G08G 1/096775* (2013.01); *B60W 60/001* (2020.02); *G08G 1/096791* (2013.01);
(Continued)

(58) Field of Classification Search
CPC ...... G08G 1/096775; G08G 1/096791; B60W 60/001; B60W 2556/65; B60W 2554/802;
(Continued)

(56) References Cited

U.S. PATENT DOCUMENTS

2018/0079419 A1   3/2018  Yamamoto
2021/0109533 A1*  4/2021  Nakadai ............... G05D 1/0276
(Continued)

FOREIGN PATENT DOCUMENTS

CN   104464317 A   3/2015
CN   111599194 A   8/2020
(Continued)

OTHER PUBLICATIONS

Written Opinion dated Mar. 22, 2022 issued in PCT International Patent Application No. PCT/JP2021/048277 and English translation, 6 pp.
(Continued)

*Primary Examiner* — Peter D Nolan
*Assistant Examiner* — Wae L Louie
(74) *Attorney, Agent, or Firm* — NIXON & VANDERHYE P.C.

(57) ABSTRACT

A travelling control system includes a plurality of vehicles each including a controller, a server including a generator configured to generate a travelling control information for the plurality of vehicles, a predictor configured to predict a merging interference between a first vehicle travelling from a merging road toward a main road and a second vehicle travelling on the main road, a sender which is provided in the first vehicle to send an interference suppressing request, and
(Continued)

a receiver which is provided in the second vehicle to receive the interference suppressing request. The controller of the second vehicle travelling on the main road is configured to execute interference suppressing control of suppressing an approach of the second vehicle to the first vehicle travelling from the merging road to the main road, in a case that the receiver receives the interference suppressing request from the first vehicle.

8 Claims, 15 Drawing Sheets

(52) U.S. Cl.
CPC ..... *B60W 2520/10* (2013.01); *B60W 2552/10* (2020.02); *B60W 2554/802* (2020.02); *B60W 2556/65* (2020.02); *B60W 2720/106* (2013.01)

(58) Field of Classification Search
CPC ......... B60W 2552/10; B60W 2520/10; B60W 2720/106
See application file for complete search history.

(56) References Cited

U.S. PATENT DOCUMENTS

| | | | | |
|---|---|---|---|---|
| 2021/0362743 | A1* | 11/2021 | Zhu | B60W 60/0011 |
| 2021/0394786 | A1* | 12/2021 | Zhu | B60W 60/0011 |
| 2022/0009493 | A1* | 1/2022 | Mizoguchi | G06V 20/58 |
| 2022/0041183 | A1* | 2/2022 | Zhu | B60W 40/105 |
| 2022/0227367 | A1* | 7/2022 | Kario | G06V 40/103 |
| 2022/0234623 | A1* | 7/2022 | Oh | B60W 40/072 |
| 2023/0176571 | A1* | 6/2023 | Mizoguchi | B60W 30/18159 |
| 2024/0208529 | A1* | 6/2024 | Lei | G01S 13/86 |
| 2024/0351615 | A1* | 10/2024 | Song | B60W 30/18163 |
| 2024/0355202 | A1* | 10/2024 | Oyama | G08G 1/0145 |
| 2025/0083672 | A1* | 3/2025 | Jayawardana | G05B 13/0265 |

FOREIGN PATENT DOCUMENTS

| | | |
|---|---|---|
| JP | 2009-251759 | 10/2009 |
| JP | 2019-57140 | 4/2019 |
| WO | WO 2016/147622 | 9/2016 |
| WO | WO 2018/179237 | 10/2018 |

OTHER PUBLICATIONS

International Search Report dated Mar. 22, 2022 issued in PCT International Patent Application No. PCT/JP2021/048277 and English translation, 4 pp.
Chinese Office Action dated Aug. 27, 2025 issued in Chinese Patent Application No. 202180088010.3 and English translation, 12 pp.

* cited by examiner

TRAVELING CONTROL SYSTEM FOR VEHICLES

This application is the U.S. national phase of International Application No. PCT/JP2021/048277 filed Dec. 24, 2021 which designated the U.S. and claims priority to Japanese Patent Application No. 2020-218968 filed Dec. 28, 2020, the entire contents of each of which are hereby incorporated by reference.

TECHNICAL FIELD

The present invention relates to a travelling control system for vehicles, and a server used for the travelling control system.

BACKGROUND

The control system provided in a vehicle of Patent Literature 1 sends, between vehicles, a plan about a non-travelling area defined as an area in which an automatically driven vehicle does not travel.

Patent Literature 2 discloses an inter vehicle communication system in which moving vehicles communicate with each other. Patent Literature 2 discloses performing the following in a case that a lane change is performed. That is, specifying a following and straight travelling automobile (vehicle) on a lane into which the lane change is performed by sensor means mounted on an own automobile (own vehicle); sending information requesting the lane change to the following and straight travelling automobile by using an identification number of the following and straight travelling automobile according to a unicast system; and perform the lane change by a control of a travelling of the own automobile after an onboard communication device has received a reply of which contents indicates acceptance of the lane change from the following and straight travelling automobile according to the unicast system.

In such a manner, a technical development regarding performing communication with other automobile in case of executing automatic driving, is carried on in automobiles.

CITATION LIST

Patent Literature

Patent Literature 1: International Publication No. 2018/179237
Patent Literature 2: International Publication No. 2016/147622

SUMMARY

Technical Problem

However, it is difficult to say that travelling of each vehicle executing travelling control of an automatic driving or of a driving support (driving assist) becomes appropriate travelling merely by each vehicle autonomously executing the travelling control and notifying it to other vehicle in the surroundings.

For example, on a road, it is arisen a condition that a first vehicle travels from a merging road to a main road, and a second vehicle travels toward a merging section of the main road.

Under this merging condition, even if the first vehicle merging into the main road and the second vehicle travelling toward the merging section of the main road notify their respective travelling contents to each other, there is a possibility that the first and second vehicles approach each other or in some cases contact with each other in the merging section.

Then, the first vehicle and the second vehicle need to approach so that the distance therebetween is not more than a predetermined degree, in order to communicate with each other. Even if the notification from the first vehicle to the second vehicle is executed after such an approached state is realized, there is a possibility that the second vehicle cannot execute the travelling control depending on the notification sufficiently, before a timing at which the first vehicle enters into the main road. For example, there is a possibility that the first and second vehicles approach closer as compared with a normal state, by the first vehicle sent the notification travelling from a merging lane toward a main lane and merging into the main lane.

Thus, it is difficult to say that the travelling of the vehicles such as automobiles becomes appropriate travelling merely by each vehicle executing their respective control by the automatic driving and notifying their respective automatic driving contents etc. to other vehicle in the surroundings.

Further, an occupant will feel anxiety about an approach of other vehicle.

Thus, in the travelling control of the vehicle, even in a case that the first vehicle travels from the merging road toward the main road by the travelling control of the automatic driving or of the driving support, and the second vehicle travels toward the merging section of the main road, it is required to increase safety and/or a sense of security etc. with respect to the travelling of those vehicles.

Solution to Problem

A travelling control system for vehicles according to an aspect of a present invention includes:
  a plurality of vehicles each including a controller configured to execute travelling control of an automatic drive or of a driving support in a case that the plurality of vehicles travels on a road;
  a server including a generator configured to generate a travelling control information for the plurality of vehicles;
  a predictor which is provided in the server and which is configured to predict a merging interference between a first vehicle, of the plurality of vehicles, travelling from a merging road toward a main road and a second vehicle, of the plurality of vehicles, travelling on the main road;
  a sender which is provided in the first vehicle travelling on the merging road and which is configured to send an interference suppressing request to the second vehicle travelling on the main road in a case that the first vehicle has received predicting information of the merging interference with the second vehicle from the server; and
  a receiver which is provided in the second vehicle travelling on the main road and which is configured to receive the interference suppressing request from the first vehicle travelling on the merging road, wherein:
  the travelling control system is configured to send the travelling control information generated by the generator of the server to the plurality of vehicles so as to cause the controller of each of the plurality of vehicles to execute a travelling control using the travelling control information; and the controller of the second vehicle travelling on the main road is configured to execute interference suppressing control of suppressing an approach of the second vehicle to the first vehicle travelling from the merging road to the main road, in a case that the receiver receives the interference suppressing request from the first vehicle.

Suitably, the predictor of the server is configured to predict the merging interference between the first vehicle and the second vehicle by determining an approach of the first vehicle and the second vehicle making a distance between the first vehicle and the second vehicle not greater than a predetermined distance, as the merging interference between the first vehicle travelling from the merging road to the main road and the second vehicle travelling on the main road.

Suitably, in a case that the predictor predicts the merging interference between the first vehicle travelling from the merging road to the main road and the second vehicle travelling on the main road, the generator of the server is configured to generate the travelling control information of decelerating, with respect to the second vehicle travelling on the main road.

Suitably, in a case that the first vehicle has received the predicting information of the merging interference with the second vehicle from the server together with the travelling control information, the controller of the first vehicle travelling on the merging road is configured to execute travelling in which a minimum speed higher than zero is maintained on the merging road.

Suitably, the sender of the first vehicle travelling on the merging road is configured to send the interference suppressing request to the second vehicle travelling on the main road, in a merging section in which travelling from the merging road to the main road is possible.

Suitably, the sender of the first vehicle and the receiver of the second vehicle are configured to send and receive the interference suppressing request via an inter vehicle communication.

Suitably, the sender of the first vehicle is configured to send information indicating at least a speed not higher than a speed of the first vehicle, as the interference suppressing request; and the controller of the second vehicle is configured to control a speed of the second vehicle such that the speed of the second vehicle is not higher than the speed relating the first vehicle received by the receiver of the second vehicle as the interference suppressing request.

Suitably, in a case that the controller of the first vehicle receives the predicting information of the merging interference with the second vehicle from the server a plurality of times, the controller of the first vehicle is configured to control travelling of the first vehicle such that the first vehicle stops in a middle of the merging road.

A server according to an aspect of a present invention is a server used for a travelling control system for vehicles, the system including a generator configured to generate travelling control information for a plurality of vehicles each including a controller configured to execute a travelling control of an automatic drive or of a driving support in a case that the plurality of vehicles travels on a road, the system being configured to send the travelling control information generated by the generator to the plurality of vehicles so as to cause the controller of each of the plurality of vehicles to execute the travelling control using the travelling control information, the server including a predictor, among the predictor which is provided in the server and which is configured to predict a merging interference between a first vehicle, of the plurality of vehicles, travelling from a merging road toward a main road and a second vehicle, of the plurality of vehicles, travelling on the main road;

a sender which is provided in the first vehicle travelling on the merging road and which is configured to send an interference suppressing request to the second vehicle travelling on the main road in a case that the first vehicle has received predicting information of the merging interference with the second vehicle from the server, and a receiver which is provided in the second vehicle travelling on the main road and which is configured to receive the interference suppressing request from the first vehicle travelling on the merging road, of the travelling control system for the vehicle, wherein the controller of the second vehicle travelling on the main road is configured to execute interference suppressing control of suppressing an approach of the second vehicle to the first vehicle travelling from the merging road to the main road, in a case that the receiver receives the interference suppressing request from the first vehicle.

Advantageous Effects of Invention

In the present invention, the travelling control information for the plurality of vehicles is generated in the server of the travelling control system for the vehicle, and sent to the plurality of vehicles. The plurality of vehicles uses the travelling control information in their respective travelling control of the automatic driving or of the driving support. In such a manner, by controlling the basic travelling of the plurality of vehicles with the travelling control system for the vehicle, the plurality of vehicles can travel principally ensuring high level of safety and a sense of security.

Further, in the present invention, the predictor configured to predict the merging interference between the first vehicle travelling from the merging road toward the main road and the second vehicle travelling on the main road, among the plurality of vehicles, is provided in the server of the travelling control system for the vehicle managing the travelling of the plurality of vehicles rather than in each vehicle. Further, the travelling control system for the vehicle sends the merging interference predicted in the server to, at least the first vehicle travelling from the merging road to the main road. In a case that the first vehicle has received the predicting information of the merging interference with the second vehicle from the server, the first vehicle sends the interference suppressing request from the sender to the second vehicle travelling on the main road. The second vehicle travelling on the main road executes the interference suppressing control of suppressing approaching of the second vehicle to the first vehicle travelling from the merging road to the main road in a case that the second vehicle receives the interference suppressing request from the first vehicle by the receiver. By doing so, in the present invention, even if a situation under which the merging interference cannot sufficiently be avoided by the travelling control of the server of the travelling control system for the vehicle may occur, the vehicles actually merging are capable of executing direct communication therebetween so as to avoid the occurrence of the merging interference.

As described above, basic safety and/or a sense of security are ensured by the server of the travelling control system for the vehicle controlling the travelling of the plurality of vehicles, and the occurrence of the merging interference can be suppressed at the site of the merging of the vehicles by the inter vehicle communication such that further safety and/or a sense of security are obtained. As a result, in the present invention, even in a case that the first vehicle travels from the merging road toward the main road by the travelling control of the automatic driving or of the driving support, and the second vehicle travels toward the merging section of the main road, it is possible to ensure high level of safety and a sense of security etc. with respect to the travelling of those vehicles.

DESCRIPTION OF EMBODIMENTS

Embodiments of the present invention will be described based on the drawings.

First Embodiment

Figure 1:
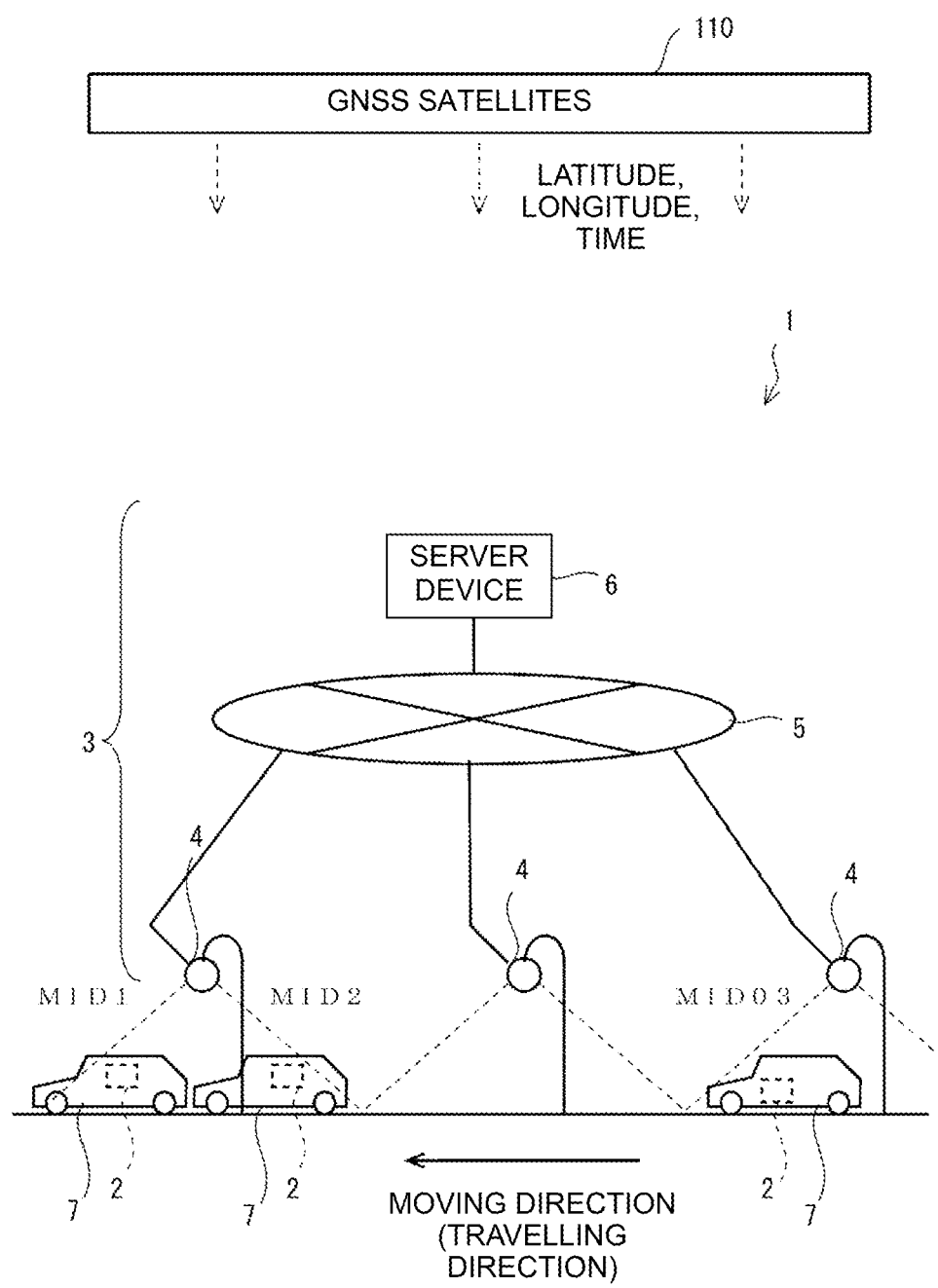
FIG. 1 is a configuration diagram of a travelling control system for an automobile according to a first embodiment of the present invention.

FIG. 1 is a configuration diagram of a travelling control system 1 for automobiles 7, according to a first embodiment of the present invention.

The travelling control system 1 of FIG. 1 includes vehicle systems 2 of a plurality of automobiles 7, and a managing system 3 configured to manage travelling of the plurality of automobiles 7.

Further, FIG. 1 depicts Global Navigation Satellite System (GNSS) satellites. The GNSS satellites 110 are positioned on satellite orbits of the Earth and emit radio waves toward the ground surface. The radio waves of the GNSS satellites contain information on latitude, longitude, and altitude indicating the position of each satellite, and information on absolute time based on which the satellites are synchronized. By receiving the radio waves from the GNSS satellites 110, it is possible to obtain the information on latitude, longitude, and altitude indicating the correct position of the receiving point at which the radio waves are received, and the correct time of the receiving point.

The automobile 7 is an example of a vehicle. The vehicle includes, for example, a motor cycle, a cart, a personal mobility, etc., other than the automobile. The automobile 7 may travel by driving force of an engine and/or a motor as a power source, change a travelling direction by an operation of a steering device, and decelerate and stop by an operation of a braking device, under the travelling control of the vehicle system 2 provided on the automobile 7.

The automobile 7 travels on a road, for example, under the travelling control of an automatic driving of the vehicle system 2. The automobile 7 may travel on the road by the travelling control of a driving support of the vehicle system 2, in a case that an occupant of the automobile 7 preforms a manual operation for the travelling of the automobile 7. Further, the vehicle system 2 may be configured such that the travelling of the automobile 7 can be controlled by the manual operation itself by the occupant.

The managing system 3 includes a plurality of wireless base stations 4, a communication network 5, and a server device (server) 6.

The plurality of wireless base stations 4 may be, for example, the wireless base stations 4 for mobile communication network services for mobile terminals, etc., and/or base stations for ITS services to the automobiles 7. The wireless base stations 4 for the mobile communication network services include, for example, base stations of the fourth-generation and base stations of the fifth-generation. The wireless base stations 4 may be fixedly installed on, for example, road shoulders, road surfaces, or buildings; or installed on moving bodies such as the automobiles 7, ships, drones, airplanes, etc.

The wireless base station 4 establishes a wireless communication path for sending and receiving information with an AP communication apparatus 70 of the vehicle system 2 of the automobile 7 that exists within radio wave reachable range (radio wave coverage) of the base station 4. In a case that the automobile 7 travelling on the road moves out of the radio wave reachable range, the wireless base station 4 that establishes the wireless communication path is switched among the plurality of wireless base stations 4. This allows the automobile 7 to keep on establishing the wireless communication path constantly during the travelling, for example, by the plurality of wireless base stations 4 arranged along the road. The wireless communication path established between the based station of the fifth-generation and the automobile 7 can send and receive significantly more information than that established between the base station of the fourth-generation and the automobile 7. In addition, the base station of the fifth-generation can be equipped with advanced information processing capability, and with the function of sending and receiving information between the base stations. In a V2V communication of the automobile 7, the automobiles 7 may send and receive information directly to each other, or the automobiles 7 may send and receive information to each other via the base station of the fifth-generation.

A plurality of wireless base stations 4 and the server device 6 are connected to the communication network 5.

The communication network 5 may be configured by, for example, a communication network 5 dedicated to the mobile communication network services, a communication network 5 dedicated to the ITS services, and/or the Internet connecting the communication networks 5 to each other, etc. The communication network 5 may include a dedicated communication network 5 newly provided for the travelling control system 1.

The Internet is a public and open wide-area communications network. Other than the Internet, the wide-area communication network includes, for example, dedicated communication networks 5 used in advanced transportation systems such as Advanced driver-assistance systems (ADAS), and ATM switching networks used exclusively for telephone switching. The travelling control system 1 may use these wide-area communication networks instead of or together with the dedicated network. Open networks tend to have larger transmission delays than closed networks, but they can maintain a certain degree of confidentiality by encrypting or otherwise encoding data. However, by using a dedicated network, in data communication between the plurality of wireless base stations 4 and the server device 6, it is possible to mutually stably perform, low latency, large-volume, and high-speed communication, compared to the case of using the Internet, etc. Even if the dedicated network is configured to send and receive information using asynchronous frames based on TCP/IP protocols, etc., and resend frames due to collision detection, etc., the transmission delay caused by these processes is difficult to become excessively large. In dedicated networks, transmission delays can be kept small compared to the Internet, where large amounts of data may be sent and received asynchronously.

The Server device 6 is a computer device configured to manage travelling of the plurality of automobiles 7.

The server device 6 may be configured by a plurality of computer devices, unlike FIG. 1.

The server device 6 may be configured by a plurality of computer devices to each of which function of the server device 6 is allotted function by function basis.

The plurality of computer devices as the server device 6 may be dispersedly arranged, for example, at the plurality of wireless base stations 4 etc.

The plurality of computer devices as the server devices 6 may be multi-layered.

The plurality of computer devices as the server device 6 may be configured by lower level computer devices dispersedly arranged at, for example, the plurality of wireless base stations 4, etc. and a higher level computer device(s) that supervises and manages the dispersed lower level computer devices.

In any case, a processing load of an individual computer device can be reduced by cooperation of the plurality of computer devices to function as the server device 6.

In addition, by realizing the dispersed arrangement of the plurality of server devices 6 with respect to the communication network 5 appropriately, it is possible to limit the range in which each piece of information is transmitted, and thereby a transmission load and a transmission delay are reduced.

Each of the plurality of server devices 6 dispersed such that the plurality of server devices 6 correspond to the plurality of wireless base stations 4, respectively, may be integrated with the wireless base station 4 and may be provided as one of the functions of the wireless base station 4. Such a wireless base station 4 having the function of the dispersed server device 6 can minimize the transmission delay time of information. The wireless base station 4 having the function of the dispersed server device 6 can function as a part of the components of the vehicle system 2 of the automobile 7, for example, by substituting execution of some of the processes of the vehicle system 2 of the automobile 7. The plurality of wireless base stations 4 may realize the process of the server device 6 or the vehicle system 2 of the automobile 7 by, for example, performing cooperative process in which the plurality of wireless base stations 4 communicate with each other without perform a communication through the server device 6. In this case, each of the plurality of wireless base stations 4 fixedly installed to a road may, for example, classify the information of the plurality of automobiles 7 accommodated in its communication area into a plurality of road maps based on their positions within the communication areas, etc., group the information of the plurality of automobiles 7 based on the classification of the road, and relay and forward the grouped information to a plurality of other wireless base stations 4. The server device 6 other than the plurality of wireless base stations 4 may be omitted. The processing of the server device 6 may be realized dispersedly by cooperative processing between the plurality of wireless base stations 4 and the server device 6.

In the travelling control system 1 such as described above, each of the automobiles 7 establishes the wireless communication path with at least one wireless base station 4. Each of the automobiles 7 can keep on establishing the wireless communication path by switching the wireless base station 4 while travelling. This allows information to be sent and received between the plurality of automobiles 7 and the server device 6.

Each of the plurality of automobiles 7 can repeatedly send information on its driving condition to the server device 6 in a relatively short cycle. The information on the driving condition sent by each of the automobiles 7 includes, for example, travelling information of each of the automobiles 7, occupant information about a user, and surrounding information of each of the automobile 7. The travelling information of the automobile 7 includes, for example, a current position, a destination, a posture and a movement of the body of the automobile 7, as well as a travelling direction and a travelling speed. The posture of the body of the automobile 7 includes, for example, a yaw rate.

The server device 6 can repeatedly receive and collect field information from each of the plurality of automobiles 7 in a relatively short cycle, the field information including the respective driving condition of the plurality of automobiles 7. The field information may include, for example, road monitoring information from cameras, etc. installed on the road, information indicating the travelling conditions of the plurality of automobile 7 obtained from other server device 6, regional traffic information, etc., in addition to own automobile information (that is, information on itself or information on the automobile having itself) sent from each of the plurality of automobiles 7.

The server device 6 may perform mapping of the collected travelling conditions of the plurality of automobiles 7 onto a current road map, etc., so as to generate travelling control information for each of the plurality of automobiles 7. Here, the travelling control information may be, for example, a course (travelling amount) or a travelable range in a small (minute) time period or in a small (minute) section of the automobile 7. The travelling control information may also include a speed or an amount of acceleration and/or deceleration, an amount of steering, or a direction of the course of the automobile 7.

The server device 6 can repeatedly send the travelling control information of each of the plurality of automobiles 7 to the plurality of automobiles 7 in a relatively short cycle. Further, the server device 6 may send the travelling control information of the plurality of automobiles 7 to other server device(s) 6.

Each of the plurality of automobiles 7 can repeatedly receive the travelling control information for itself from the server device 6 in a relatively short cycle.

Each of the plurality of automobiles 7 can execute the travelling control for itself by using the travelling control information received from the server device 6.

Thereby, each of the plurality of automobiles 7 can continue its travelling by using the travelling control information repeatedly received from the server device 6 in a relatively short cycle.

By the server device 6 continuing to generate the travelling control information for the plurality of automobiles 7 based on which, for example, collision or approaching with respect to other automobile are not caused, the plurality of automobiles 7 can continue to execute the travelling control that is basically safe and that gives a sense of security to the occupant(s). Each of the plurality of automobile 7 can execute the travelling that is safe and that gives a sense of security to the occupant(s) from the current position to the desired destination, by obtaining the travelling control information for each of the small sections continuously and repeatedly, and controlling the travelling according to the obtained travelling control information.

Figure 2:
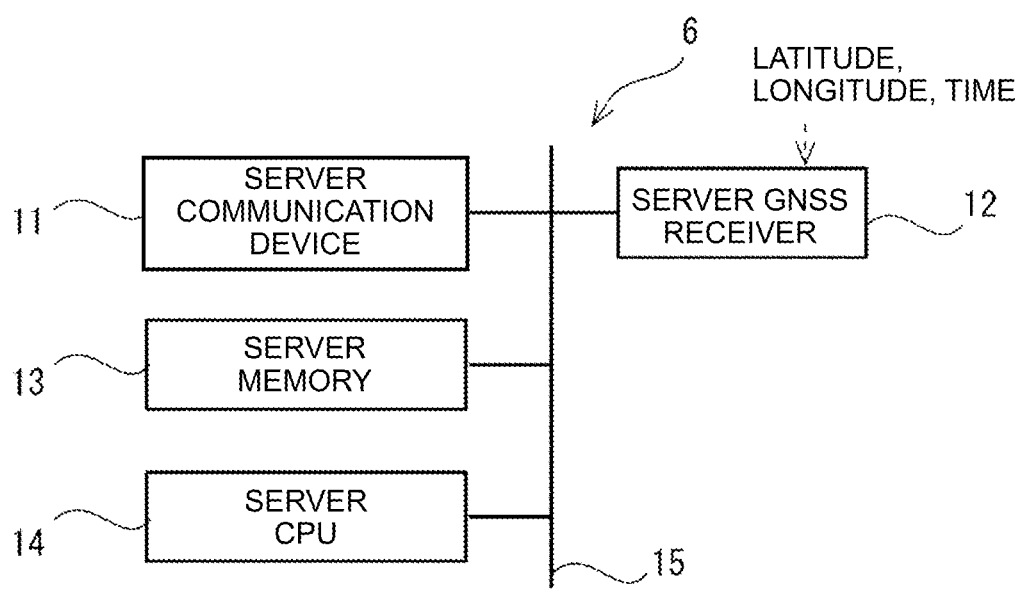
FIG. 2 is a hardware configuration diagram of a server device of FIG. 1.

FIG. 2 is a hardware configuration diagram of the server device 6 of FIG. 1.

The server device 6 of FIG. 2 includes a server communication device 11, a server GNSS receiver 12, a server memory 13, a server CPU 14, and a server bus 15 to which the server communication device 11, the server GNSS receiver 12, the server memory 13, and the server CPU 14 are connected.

The server communication device 11 is connected to the communication network 5. The server communication device 11 sends and receives information to and from other devices connected to the communication network 5, such as for example, the wireless base station 4 and/or the vehicle system 2 of the automobile 7.

The server GNSS receiver 12 receives the radio waves from the GNSS satellites 110 to obtain the current time. The server device 6 may be equipped with an undepicted server timer that is calibrated by the current time of the server GNSS receiver 12.

The server memory 13 records programs and data to be executed by the server CPU 14.

The server CPU 14 reads the program from the server memory 13 and executes the program. With this, a server controller (server control unit) is realized in the server device 6.

The server CPU 14 as the server controller manages the overall operation of the server device 6.

The server CPU 14 as the server controller also functions as a controller for the entire of the travelling control system 1. The server CPU 14 manages and controls the travelling of the plurality of automobiles 7. The server CPU 14 collects the field information including the travelling conditions of the plurality of automobiles 7, generates the driving control information for the plurality of automobiles 7 so that the travelling of the plurality of automobiles 7 becomes smooth basically and safety and a sense of security of the travelling of the plurality of automobiles 7 is maximized, and send the generated driving control information to each of the plurality of automobiles 7.

Figure 3:
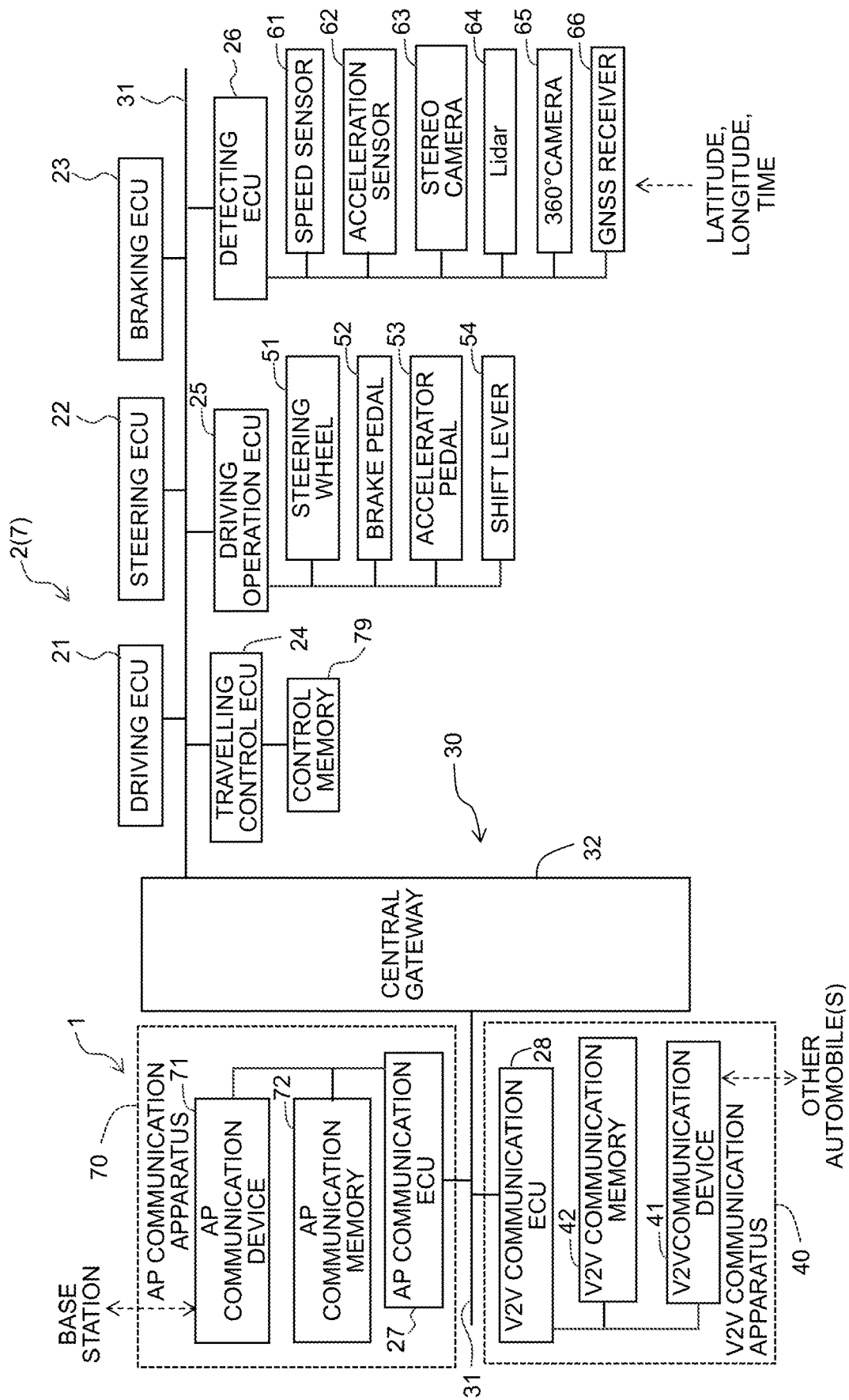
FIG. 3 is a configuration diagram of a vehicle system configured to control travelling of the automobile of FIG. 1.

FIG. 3 is a configuration diagram of the vehicle system 2 configured to control the travelling of the automobile 7 of FIG. 1.

The vehicle system 2 provided in the automobile 7 of FIG. 3 is representatively depicted by a plurality of control ECUs (Electronic Control Units) into each of which a plurality of control devices is incorporated. The control devices may include, like the server device of FIG. 2 and in addition to the control ECUs, for example, a memory configured to record control programs and data, an input-output port, a timer configured to measure time (time period) and time, and an internal bus to which those components are connected.

FIG. 3 depicts, as the plurality of control ECUs for the vehicle system 2 of the automobile 7, for example, a driving ECU 21, a steering ECU 22, a braking ECU 23, a travelling control ECU 24, a driving operation ECU 25, a detecting ECU 26, an AP communication ECU 27, and a V2V communication ECU 28. The vehicle system 2 of the automobile 7 may include other control ECUs not depicted in the drawing.

The plurality of control ECUs are connected to an automobile network 30, such as CAN (Controller Area Network) and/or LIN (Local Interconnect Network), for example, employed in the automobile 7. The automobile network 30 may be configured by a plurality of bus cables 31 capable of connecting the plurality of control ECUs and a central gateway (CGW) 32 as a relay device to which the plurality of bus cables 31 are connected. An ID is assigned to each of the plurality of control ECUs as identification information different from each other among the plurality of control ECUs. A control ECU basically outputs data to other control ECUs periodically. The ID of the output source control ECU and the ID of the output destination control ECU are added to the data. Each of other control ECUs monitors the bus cable 31, and if the ID of the output destination is, for example, its own, it obtains the data and executes a process based on the data. The central gateway 32 monitors each of the plurality of bus cables 31 connected to the central gateway 32, and if the central gateway 32 detects the control ECU connected to one bus cable 31 different from the bus cable 31 to which the control ECU of the output origin is connected, then the central gateway 32 outputs the data to the one bus cable 31. Owing to a relay process such as above performed by the central gateway 32, the plurality of control ECUs can perform inputting and outputting of data between first control ECUs connected to a first bus cable 31 and second control ECUs, different from the first control ECUs, connected to a second bus cable 31 different from the first bus cable.

For example, a steering wheel 51, a brake pedal 52, an accelerator pedal 53, a shift lever 54, etc. are connected to the driving operation ECU 25, as operating components for the user to control the travelling of the automobile 7. In a case that the operating components are operated, the driving operation ECU 25 outputs data including the presence or absence of the operation and the operation amount to the automobile network 30. Further, the driving operation ECU 25 may execute a process regarding the operation to the operating components, and include the result of the process into the data. For example, in a case that the accelerator pedal 53 is operated in a situation where another automobile and/or a fixed object exists in the moving direction of the automobile 7, the driving operation ECU 25 may determine the abnormal operation, and include the result of the determination into the data.

For example, a speed sensor 61 configured to detect a speed (velocity) of the automobile 7, an acceleration sensor 62 configured to detect a rate of acceleration of the automobile 7, a stereo camera 63 configured to image the outside surroundings of the automobile 7, a LIDAR 64 configured to detect objects existing around the automobile 7 by laser radiation, a 360 degrees camera (360° camera) 65 configured to image a surrounding of the automobile 7 in a range of 360 degrees, the GNSS receiver 66 configured to detect a position of the automobile 7, etc. are connected to the detecting ECU 26, as detecting components configured to detect a travelling condition of the automobile 7. The GNSS receiver 66 receives the radio waves from the GNSS satellites 110 similar to or same as those for the server GNSS receiver 12, and obtains latitude, longitude, and altitude those being the current position of the own automobile (that is, itself, or the automobile having itself), and the current time. The current time of the automobile 7 is thus expected to match the current time by the server GNSS receiver 12 of the server device 6 with a high degree of accuracy. The detecting ECU 26 obtains detecting information from the detecting components and outputs data including the detecting information to the automobile network 30. Further, the detecting ECU 26 may execute a process based on the detecting information and include the result of the process into the data. For example, in a case that the acceleration sensor 62 detects the rate of acceleration over a collision detecting threshold, the detecting ECU 26 determines a collision detection, and may include the result of the collision detection into the data. The detecting ECU 26 may extract, based on the image obtained by the stereo camera 63, a pedestrian and/or another automobile 7 existing around the own automobile; determine a type and/or an attribute of the automobile 7; estimate a relative direction, a relative distance, and/or a travelling direction of the automobile 7 depending on a position, a size and/or a change of the automobile 7 on the image; and output the data to the automobile network 30 in a state that information obtained as a result of the estimation is included in the data.

An AP communication device 71, and an AP communication memory 72 are connected to the AP communication ECU 27. The AP communication ECU 27, the AP communication device 71, and the AP communication memory 72 constitute an AP communication apparatus 70 configured to establish, in the automobile 7, the wireless communication circuit between the automobile 7 and the wireless base station 4. The AP communication device 71 sends and receives data that is sent and received by the AP communication ECU 27 with respect to the wireless base station 4 outside the automobile 7. The AP communication memory 72 is a computer-readable recording medium, and records a program to be executed by the AP communication ECU 27, setting values, and data to be sent and received by the AP communication ECU 27. The AP communication ECU 27 sends and receives data to and from the server device 6 by using the AP communication device 71. The AP communication ECU 27 collects own automobile information through the automobile network 30, for example, and sends the collected information to the server device 6. The AP communication ECU 27 obtains, for example, travelling control information etc. sent by the server device 6 to the own automobile, from the AP communication device 71, and records the obtained information in the AP communication memory 72.

The own automobile information collected by the AP communication ECU 27 includes, for example, in-car information such as the condition of the user in the car, information on the travelling condition of the own automobile, surrounding information such as the travelling environment of the own automobile, area information of the area in which the own automobile travels. The surrounding information may include information on other automobile(s) existing around the own automobile. The information on the travelling condition of the own automobile includes, for example, information based on autonomous sensors (sensors mounted on the automobile: acceleration, GPS, gyro, electronic compass, barometric pressure, camera, radar, ultrasonic, infrared rays, etc.) such as those described above provided on the own automobile 7. Autonomous sensors may detect information indicating the travelling condition of the own automobile, automobile information such as user information and car number of the own automobile, surrounding information or area information of the own automobile. The information on the travelling condition of the own automobile may include information on the travelling condition that can be calculated based on the detecting performed by those sensors, for example, a yaw rate. The own automobile information sent from the AP communication ECU 27 may be the own automobile information itself collected by the AP communication ECU 27, or may be information obtained by applying processing, filtering, coding, and/or quantization to the information collected. The AP communication ECU 27 sends the own automobile information to be sent to the server device 6 to the wireless base station 4 periodically and repeatedly.

The information that the AP communication ECU 27 obtains from the server device 6 includes the travelling control information used for the travelling control of the own automobile, etc. The AP communication ECU 27 periodically and repeatedly receives the travelling control information etc. to be obtained from the server device 6, from the wireless base station 4.

A V2V communication device 41 and a V2V communication memory 42 are connected to the V2V communication ECU 28. The V2V communication ECU 28, the V2V communication device 41, and the V2V communication memory 42 constitute a V2V communication apparatus 40 configured to execute direct communication with other automobiles, in the automobile 7. The V2V communication device 41 sends and receives data send and received by the V2V communication ECU 28 via an inter-vehicle communication with the V2V communication apparatus 40 of another automobile. The V2V communication memory 42 is a computer-readable recording medium configured to record programs to be executed by the V2V communication ECU 28, setting values, and data send and received by the V2V communication ECU 28. The V2V communication ECU 28 uses the V2V communication device 41 to send and receive data to and from the V2V communication apparatus 40 of another automobile. The V2V communication ECU 28 collects V2V communication information generated in the vehicle system 2 via the automobile network 30 for example, and send the collected information to the V2V communication apparatus 40 of another automobile. The V2V communication ECU 28 obtains, for example, information sent by the V2V communication apparatus 40 of another automobile to the own automobile from the V2V communication device 41, and records the obtained information in the V2V communication memory 42.

Note that a portable terminal, etc. can be used for the AP communication apparatus 70 and/or the V2V communication apparatus 40. In this case, the portable terminal may be connected to the automobile network 30 by the bus cable 31 or via an undepicted wireless router connected to the automobile network 30.

A control memory 79 is connected to the travelling control ECU 24. The control memory 79 is a computer-readable recording medium in which programs to be executed by the travelling control ECU 24, setting values, etc. are recorded. The control memory 79 may record information on the control contents by the travelling control ECU 24. The travelling control ECU 24 reads the program from the control memory 79 and executes the read program. By doing so, the travelling control ECU 24 may function as a controller (a control unit) configured to control the travelling of the automobile 7.

The travelling control ECU 24 obtains information from, for example, the AP communication ECU 27, the V2V communication ECU 28, the detecting ECU 26, the driving operation ECU 25, etc. through the automobile network 30, and executes the control of an automatic driving or a manual driving support for the travelling of the automobile 7. The driving control ECU 24 generates driving control data for controlling the travelling of the automobile 7 based on the obtained information. For example, the travelling control ECU 24 generates the travelling control data based on the travelling control information obtained from the AP communication ECU 27 so as to control the travelling of the automobile 7 basically following the travelling control information. The travelling control ECU 24 outputs the generated travelling control data to the driving ECU 21, the steering ECU 22, and the braking ECU 23. The driving ECU 21, the steering ECU 22, and the braking ECU 23 control the travelling of the automobile 7 according to the inputted travelling control data.

Figure 4:
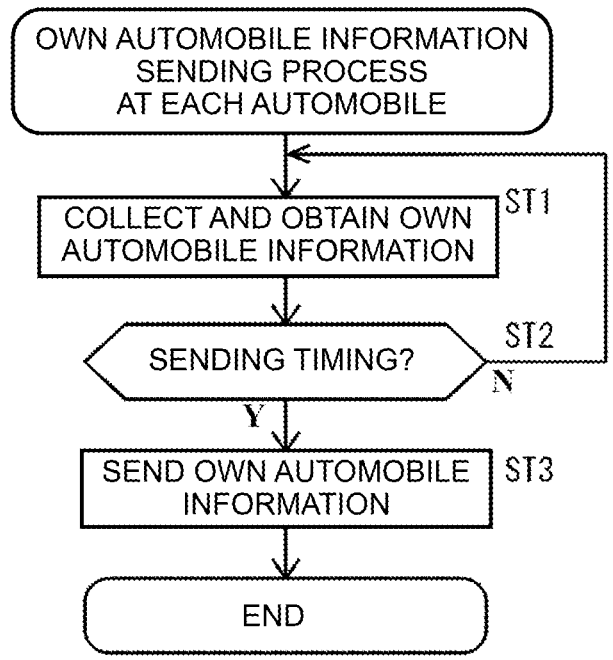
FIG. 4 is a flowchart of a process executed by the vehicle system of the automobile of FIG. 3 to send own automobile information.

FIG. 4 is a flowchart of a process performed by the vehicle system 2 of the automobile 7 of FIG. 3 to send the own automobile information.

In the vehicle system 2 of the automobile 7 of FIG. 3, for example, the AP communication ECU 27 may execute the process of sending the own automobile information of FIG. 4. In a case that, for example, the AP communication ECU 27 is in a state that the communication with the wireless base station 4 is possible, the AP communication ECU 27 executes the process of sending the own automobile information of FIG. 4 periodically and repeatedly. The cycle of the sending of the own automobile information by the AP communication ECU 27 may be in a range of tens of milliseconds to several seconds, for example.

In a step ST1, the AP communication ECU 27 collects and obtains the own automobile information from each part of the automobile 7. The AP communication ECU 27 collects the own automobile information from the driving control ECU 24, the detecting ECU 26, the driving operation ECU 25, etc. through the automobile network 30, for example. The own automobile information may include, for example, the travelling condition of the own automobile such as the current position of the own automobile, the current time, the travelling direction, the travelling speed, the yaw rate; the condition of the user in the car; information on the surroundings of the own automobile; and information on the area in which the own automobile is travelling. The AP communication ECU 27 records the collected own automobile information in the AP communication memory 72.

In a step ST2, the AP communication ECU 27 determines whether or not it is a timing for sending the own automobile information. The timing for sending the own automobile information may occur in a regular cycle. The AP communication ECU 27 may determine, based on the current time of the GNSS receiver 66 or the time of the timer provided in the automobile 7 for example, whether or not the elapsed time since the previous sending timing has exceeded a predetermined sending cycle, and may determine that it is the timing for sending the own automobile information in a case that the elapsed time has exceeded the predetermined sending cycle. In this case, the AP communication ECU 27 advances the process to a step ST3. In a case that it is not the timing for sending the own automobile information, the AP communication ECU 27 returns the process to the step ST1.

In the step ST3, the AP communication ECU 27 sends the information collected in the step ST1 from the AP communication device 71 to the server device 6. The AP communication device 71 reads the own automobile information from the AP communication memory 72, and sends the read own automobile information to the server device 6 through the base station with which the wireless communication path is established. The sent information from the AP communication device 71 of the automobile 7 will be sent to the server device 6 through the communication network 5 after being received by the wireless base station 4. The sent information from the AP communication device 71 may include information such as the position, time and ID etc. of the automobile 7 at a timing at which the AP communication device 71 executes the sending.

Figure 5:
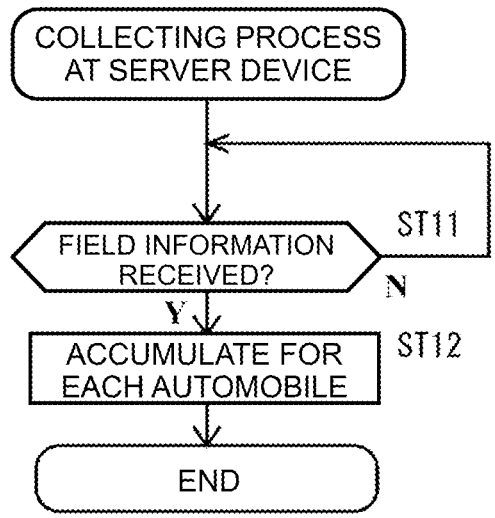
FIG. 5 is a flowchart of a process executed by the server device of FIG. 2 to collect field information such as own automobile information of a plurality of automobiles etc.

FIG. 5 is a flowchart of a process performed by the server device 6 of FIG. 2 to collect field information, such as the own automobile information of a plurality of automobiles 7.

The server CPU 14 of the server device 6 of FIG. 2 may execute the process of collecting field information of FIG. 5 each time the server communication device 11 receives new information.

In step ST1, the server CPU 14 determines whether or not the server communication device 11 has received the field information such as the own automobile information of the plurality of automobiles 7 as new information. In a case that the server communication device 11 has not received any field information, the server CPU 14 repeats the step ST11. In a case that the server communication device 11 receives the field information, the server CPU 14 advances the process to the step ST12.

In the step ST12, the server CPU 14 stores the received field information in the server memory 13. The server CPU 14 may classify the received field information automobile 7 by automobile 7 basis, for example, and store the classified field information in the server memory 13. By doing so, information indicating the travelling condition of a plurality of automobiles 7 of which travelling is managed by the server device 6 is accumulated in the server memory 13 of the server device 6. The information accumulated in the server memory 13 may be continuously updated to the latest information at each sending cycle of the own automobile information of the vehicle system 2 of the automobile 7, for example.

Figure 6:
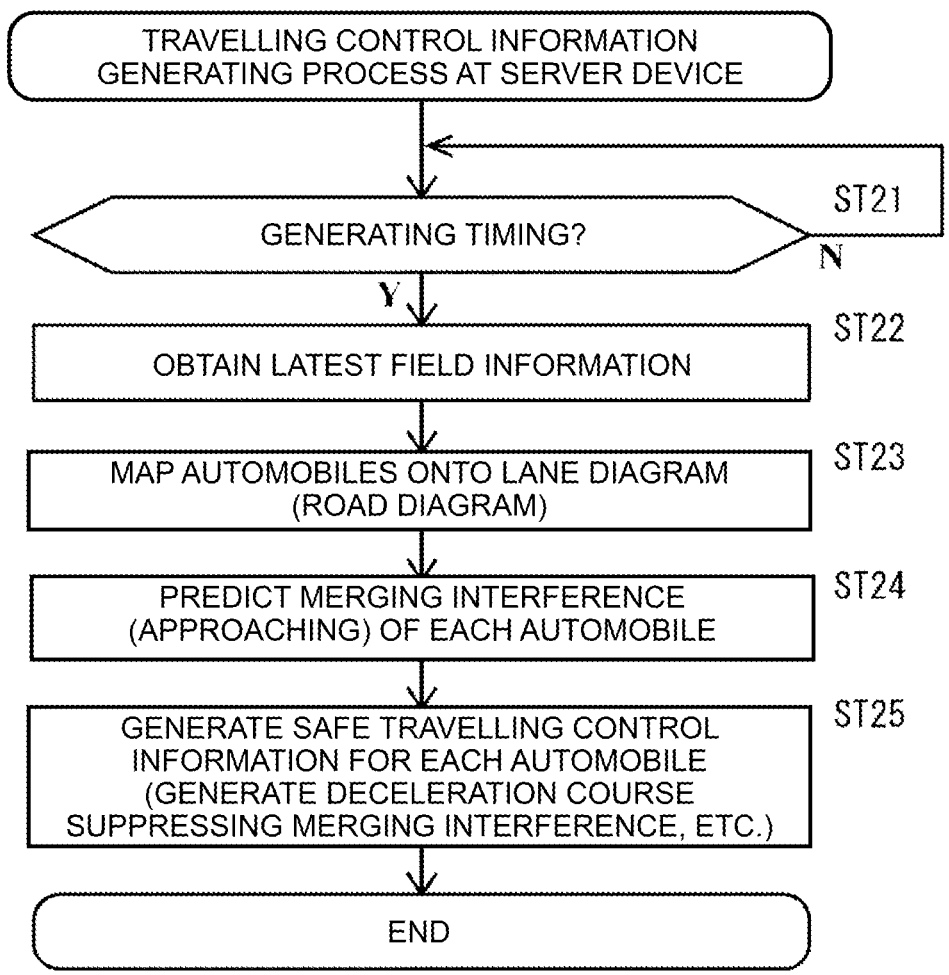
FIG. 6 is a flowchart of a process executed by the server device of FIG. 2 to generate travelling control information used in the plurality of automobiles.

FIG. 6 is a flowchart of a process performed by the server device (server) 6 of FIG. 2 to generate travelling control information used in a plurality of automobiles 7.

The server CPU 14 of the server device 6 of FIG. 2 may execute the process of generating travelling control information of FIG. 6 at each predetermined generating timing.

In a step ST21, the server CPU 14 determines whether or not it is a timing to generate new travelling control information for the plurality of automobiles 7. The server CPU 14 may determine, based on the current time of the server GNSS receiver 12, whether or not the elapsed time since the previous generation timing has exceeded a predetermined generating cycle. In a case that the elapsed time has not exceeded the generating cycle, the server CPU 14 repeats the determining process of the step ST21. If the elapsed time has exceeded the generating cycle, the server CPU 14 determines that it is the timing to generate new travelling control information and advances the process to a step ST22.

In the step ST22, the server CPU 14 obtains, from the server memory 13, the latest field information on the travelling conditions of the plurality of automobiles 7 that has been accumulated by the receiving performed by the server communication device 11.

In a step ST23, the server CPU 14 identifies the current positions of the plurality of automobiles 7 by using the latest field information and maps the current travelling conditions of the plurality of automobiles 7 onto the current road map. Other than that, the travelling conditions in future predicted based on the current information of each of the automobiles 7 such as, for example, a trajectory based on the current speed, may be mapped onto the current road map. In this case, the current position of each of the automobiles 7 as well as predicted position in future of each of the automobiles 7 will be mapped onto the current road map. The server CPU 14 may record the current road map onto which the current travelling conditions of the plurality of automobiles 7 are mapped in the server memory 13.

In a step ST24, the server CPU 14 performs as a predicting unit (predictor) so as to predict and determine a merging interference of each of the automobiles 7 by using the current road map onto which the current driving conditions of the plurality of automobiles 7 are mapped. In a case that for example a first automobile 8, among the plurality of automobiles 7 travelling under the travelling control using the travelling control information, is travelling from a merging road (merging lane) toward a main road (main lane road) to merge into the main road as depicted in FIG. 11 (described later), the server CPU 14 predicts and determines the merging interference with the merging first automobile 8 for each of second automobiles 9 travelling on the main road toward a merging section. In the predicting of the merging interference, the server CPU 14 may determine a contact between the first automobile 8 on the merging road and the second automobile 9 on the main road. However, preferably the server CPU 14 may determine an approaching within a predetermined distance between the first automobile 8 and the second automobile 9. Here, the predetermined distance may be fixed or may be changed depending on the speed of the automobile 7. By determining the approaching in the predicting of the merging interference, it is possible to not only avoid a collision and ensure safety, but also avoid abnormal approaching with respect to other automobiles and increase a sense of security of the occupants. The server CPU 14 may record the predicted merging interference of the automobiles 7 in the server memory 13.

In a step ST25, the server CPU 14 generates the travelling control information used by each of the plurality of automobile 7 managed by the travelling control system 1 for performing its travelling control, by using the current road map onto which the current travelling conditions of the plurality of automobiles 7 are mapped. The server CPU 14 generates the travelling control information that realizes travelling as safety as possible and as secure as possible, as the travelling control information for each of the automobiles 7. The server CPU 14 may generate, for example, the travelling control information by which the automobile 7 travels with sufficient following distances in a state that the automobile 7 is apart from each of other automobiles travelling in front of and in rear of itself and on the same lane as itself not less than a predetermined distance. Other than the above, for example, the server CPU 14 may generate the travelling control information by which the speed of the second automobile 9 is slowed down so as to ensure the following distance with respect to the first automobile 8 on the merging lane described above and suppress the merging interference. The server CPU 14 may record the travelling control information generated for the plurality of automobiles 7 in the server memory 13.

Figure 7A:
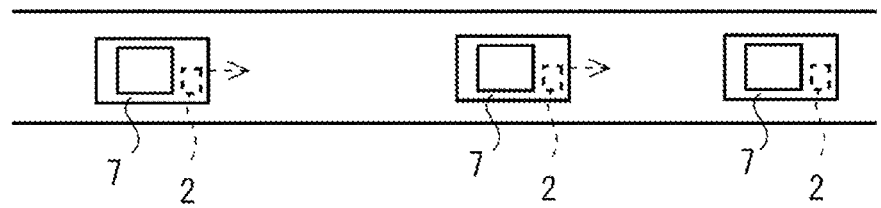
FIGS. 7A and 7B are explanatory diagrams of a current road map used in the mapping of FIG. 6
Figure 7B:
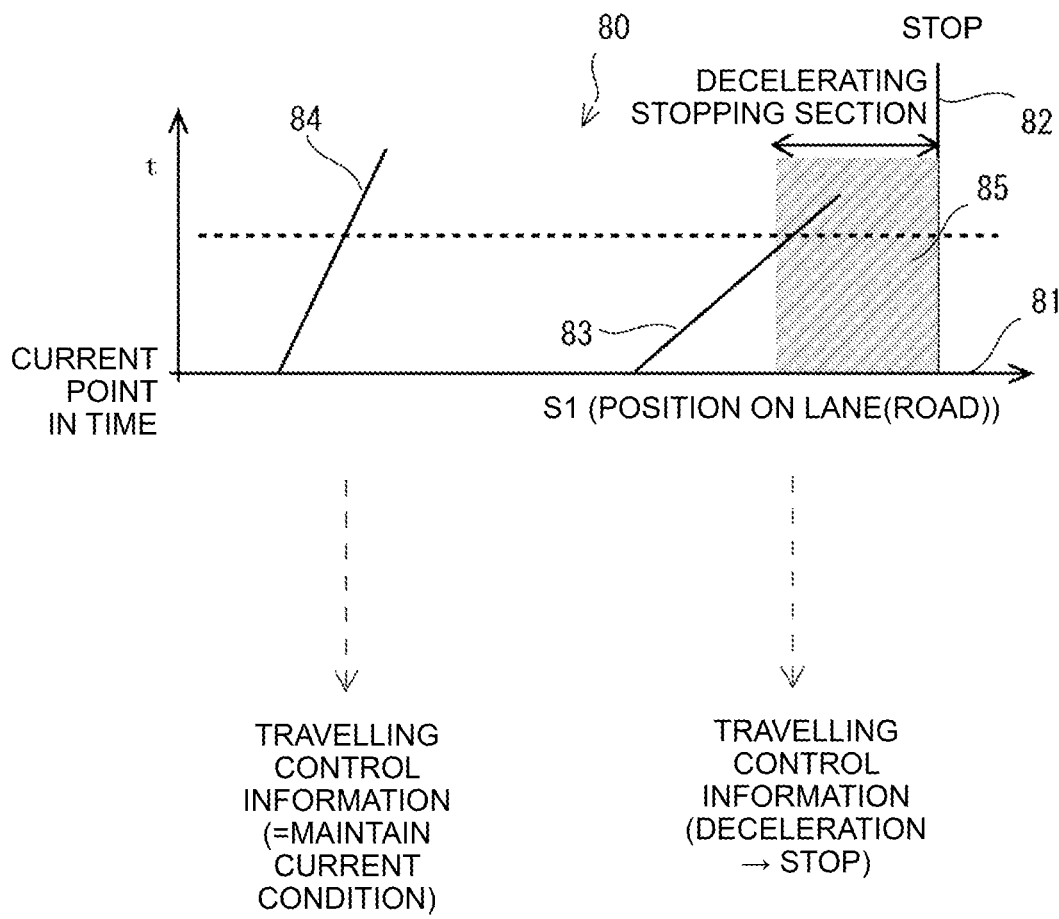

FIGS. 7A and 7B are explanatory diagrams of the current road map used for the mapping of FIG. 6.

FIG. 7A is an explanatory diagram of a travelling condition in which the plurality of automobiles 7 travels in a row on a road with single lane.

FIG. 7B is a current road map 80 regarding the road with single lane of FIG. 7A.

The current road map 80 may be provided, for example, for each lane of the area or the road for which the travelling control system 1 manages the travelling of the automobile 7. That is, for a road having a plurality of lanes, there may be a plurality of current road maps 80 corresponding to the plurality of lanes respectively. Further, in a case that the merging road is connected to the main road, there may be the current road map 80 corresponding to the main road and the current road map 80 corresponding to the merging road.

In the current road map 80 of FIG. 7B, the horizontal axis 81 indicates a position on the lane (road). The vertical axis indicates time. The time flows from the bottom to the top. The origin corresponds to the current point in time (present point in time).

In FIG. 7A, three automobiles 7 are travelling on the road with single lane.

In this case, the server CPU 14 generates the current road map 80 of FIG. 7B in the step ST23 of FIG. 6. In the current road map 80 of FIG. 7B, three trajectories 82 to 84 corresponding respectively to the three automobiles 7 will be mapped.

The trajectory 84 corresponding to the automobile 7 at the left-end of FIG. 7A will be mapped onto the left part of FIG. 7B near the origin. The trajectory 84 is inclined because the automobile 7 at the left-end of FIG. 7A is travelling at a speed different from zero. The inclination of the trajectory 84 increases or decreases in response to the current (present) speed of the automobile 7.

The trajectory 83 corresponding to the automobile 7 at the center of FIG. 7A will be mapped onto the center part of FIG. 7B. The trajectory 83 is inclined because the automobile 7 at the center of FIG. 7A is travelling at a speed different from zero. Because the speed of the automobile 7 in the center of FIG. 7A is large, the trajectory 83 is inclines greatly with respect to the vertical axis.

The trajectory 82 corresponding to the automobile 7 at the right-end of FIG. 7A will be mapped onto the right part of FIG. 7B. The trajectory 82 is in parallel with the vertical axis because the automobile 7 at the right-end of FIG. 7A is stopped and its speed is zero.

In this case, the server CPU 14 may generate, in the step ST25 of FIG. 6 and as the travelling control information for the automobile 7 at the left-end of FIG. 7A, the travelling control information to continue travelling while maintaining the current speed.

Further, it is predicted that if the automobile 7 at the center of FIG. 7A continues travelling maintaining the current condition, the automobile 7 at the center of FIG. 7A reaches the decelerating stopping section 85 of the automobile 7 at the right-end of FIG. 7A being stopped. Thus, the server CPU 14 may generate the travelling control information to decelerate the automobile 7 at the center of FIG. 7A such that the automobile 7 at the center of FIG. 7A can stop in the decelerating stopping section 85 in front of the automobile 7 at the right-end of FIG. 7A.

In such a manner, the server CPU 14 generates, based on the collected field information and as the travelling control information for the plurality of automobiles 7, the travelling control information capable of ensuring safety and security as much as possible by suppressing abnormal approaching and/or the merging interference from occurring.

Figure 8:
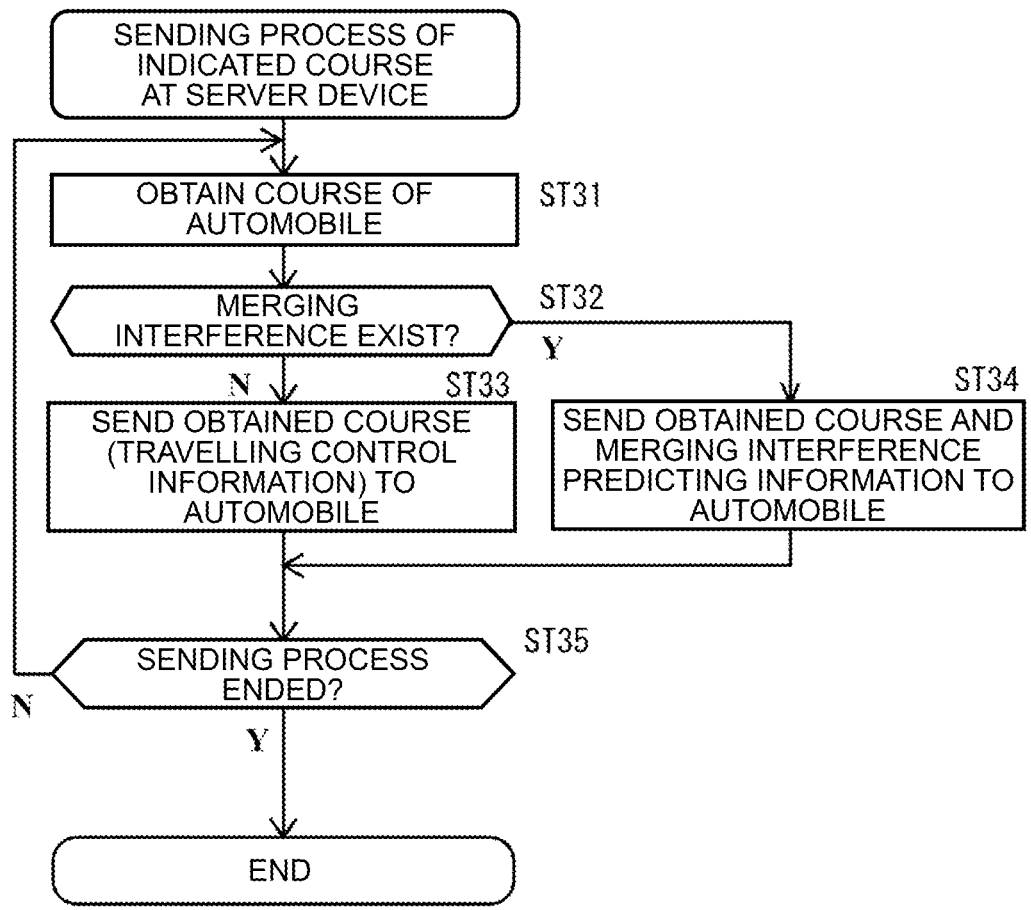
FIG. 8 is a flowchart executed by the server device of FIG. 2 to send information to the plurality of automobiles.

FIG. 8 is a flowchart of a process performed by the server device 6 of FIG. 2 to send information to the plurality of automobiles 7.

The server CPU 14 of the server device 6 of FIG. 2 may execute the sending process of FIG. 8 at each predetermined sending timing.

In a step ST31, the server CPU 14 obtains the latest travelling control information for the automobile 7 recorded in the server memory 13.

In a step ST32, the server CPU 14 determines whether or not the merging interference is predicted for the automobile 7 of which travelling control information was obtained. The server CPU 14 may determine whether or not the merging interference is predicted for the automobile 7 of which travelling control information was obtained, by obtaining the latest predicting determination result of the merging interference recorded in the server memory 13. In a case that no merging interference is predicted for the automobile 7 of which travelling control information was obtained, the server CPU 14 advances the process to the step ST33. In a case that the merging interference is predicted for the automobile 7 of which travelling control information was obtained, the server CPU 14 advances the process to the step ST34.

In the step ST33, the server CPU 14 sends the obtained travelling control information to the automobile 7 corresponding thereto. The server communication device 11 sends the travelling control information obtained by the server CPU 14 to the automobile 7 through the communication network 5 and the wireless base station 4. Thereafter, the server CPU 14 advances the process to a step ST35.

In the step ST34, the server CPU 14 sends the obtained travelling control information and the merging interference predicting result to the automobile 7 corresponding thereto. The server communication device 11 sends the travelling control information and the merging interference predicting result obtained by the server CPU 14 to the automobile 7 through the communication network 5 and the wireless base station 4. Thereafter, the server CPU 14 advances the process to the step ST35.

In the step ST35, the server CPU 14 determines whether or not the process of sending the travelling control information has been completed for the plurality of automobiles 7 under its management. In a case that the process of sending the travelling control information has not been completed for the plurality of automobile 7, the server CPU 14 returns the process to the step ST31. The server CPU 14 repeats the process from the step ST31 to the step ST35 for the next automobile 7. In a case that the process of sending the travelling control information is completed for the plurality of automobiles 7, the server CPU 14 terminates this process.

Figure 9:
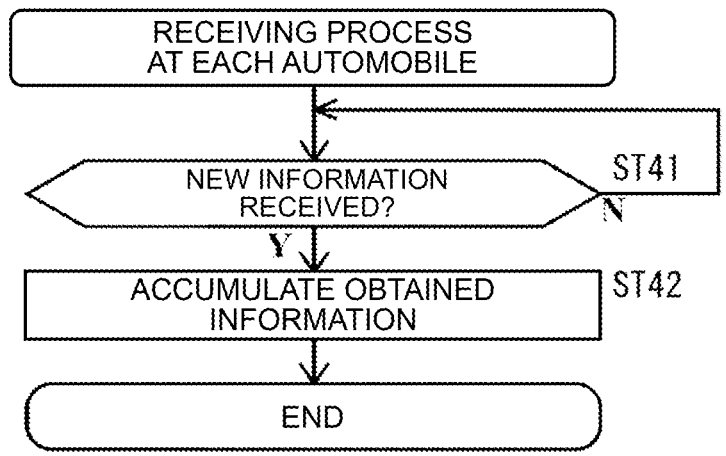
FIG. 9 is a flowchart executed by each of the plurality of vehicles to receive information from the server device.

FIG. 9 is a flowchart of a process performed by each of the plurality of automobiles 7 to receive information from the server device 6.

In the vehicle system 2 of the automobile 7 of FIG. 3, for example, the AP communication ECU 27 may execute the receiving process of FIG. 9. The AP communication ECU 27 can receive the information from the server device 6, if the AP communication ECU 27 is in a state that it is capable of communicating with the wireless base station 4, for example.

In a step ST41, the AP communication ECU 27 determines whether or not the AP communication device 71 has received new information addressed to the own automobile. The AP communication device 71 is capable of receiving new information from the server device 6. In a case that the AP communication device 71 has not received the new information from the server device 6, the AP communication ECU 27 determines that the new information has not been received, and repeats the step ST41. In a case that the AP communication device 71 receives the new information from the server device 6, the AP communication ECU 27 advances the process to a step ST42.

In the step ST42, the AP communication ECU 27 stores the received information in the AP communication memory 72. By doing so, the information received by the AP communication device 71 from the server device 6, such as for example, the travelling control information and the merging interference predicting result etc. described above, is accumulated and stored in the AP communication memory 72.

Note that the AP communication ECU 27 may overwrite the information received in the past and already recorded in the AP communication memory 72 by the information newly received.

Figure 10:
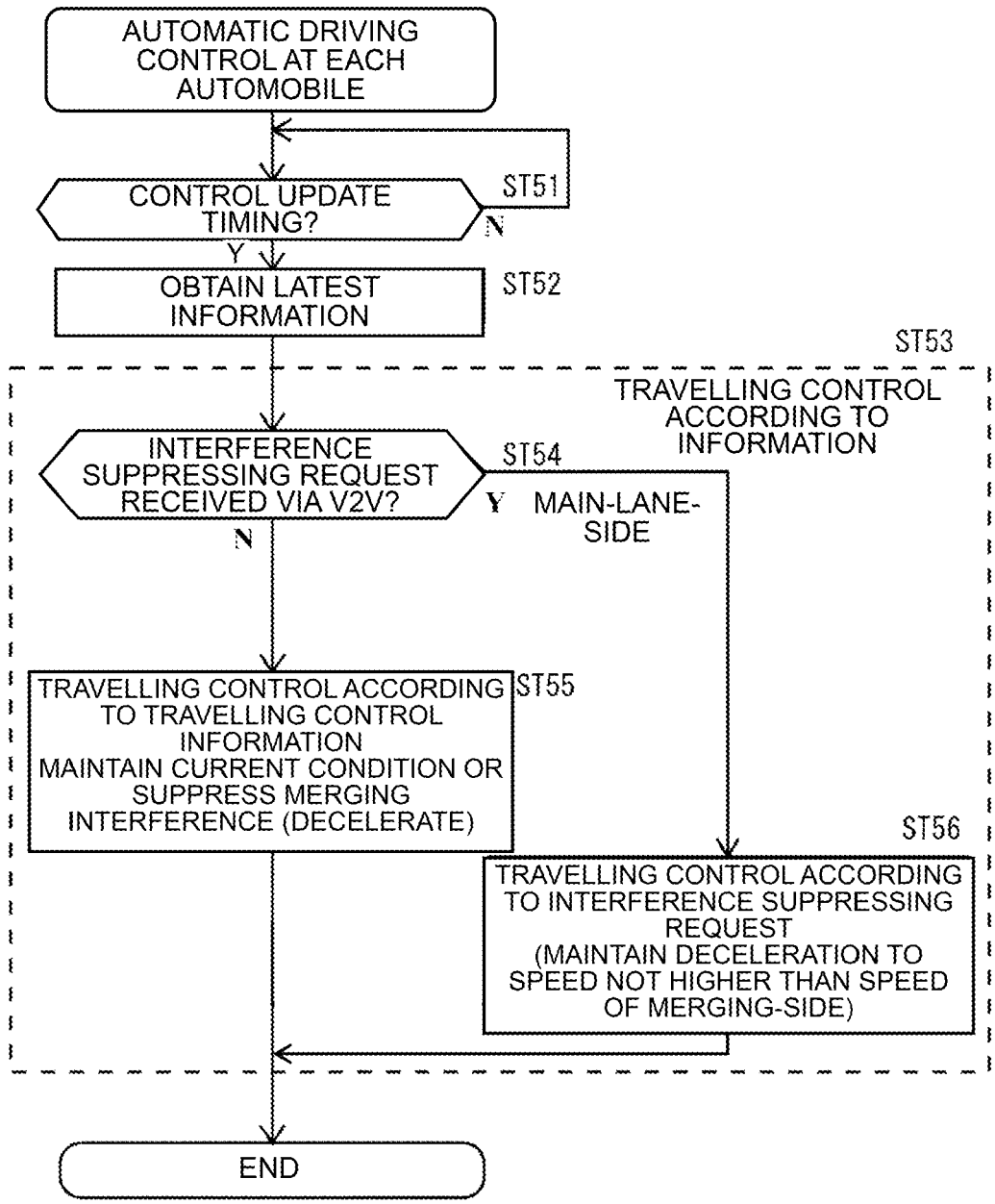
FIG. 10 is a flowchart of an automatic driving control executed by each of the plurality of automobiles in the first embodiment.

FIG. 10 is a flowchart of an automatic driving control executed by each of the plurality of automobiles 7, in the first embodiment.

In the vehicle system 2 of the automobile 7 of FIG. 3, for example, the travelling control ECU 24 may execute the automatic driving control of FIG. 10. The driving control ECU 24 may repeatedly execute the automatic driving control of FIG. 10, for example, in the generating cycle of the travelling control information at the server device 6.

In a step ST51, the travelling control ECU 24 determines whether or not it is a timing to update the control. The travelling control ECU 24 may determine, based on the current time of the GNSS receiver 66, whether or not the elapsed time since the previous control timing has exceeded a predetermined update cycle. Further, the driving control ECU 24 may estimate the end time of the control of the course currently executing and determine whether or not the remaining time until the estimated end time is less than a threshold value. Then, in a case that it is not the control update timing, the travelling control ECU 24 repeats the step ST51. In a case that the control update timing has passed, the travelling control ECU 24 advances the process to a step ST52.

In the step ST52, the travelling control ECU 24 obtains the latest information. The travelling control ECU 24 obtains the latest travelling control information etc. from the AP communication memory 72. The travelling control ECU 24 may obtain detection information of the autonomous sensor of the own automobile, etc. The detection information of the autonomous sensor of the own automobile may include, for example, the current position of the automobile 7, the current time, the current speed of the automobile 7 as a result of the previous travelling control, the travelling direction, and information on other automobiles around the own automobile.

In a step ST53, the travelling control ECU 24 executes travelling control of the own automobile based on various latest information obtained in the step ST52.

For example, in a case that the detection information of the autonomous sensor indicates that the travelling condition of the own automobile has no problem, the travelling control ECU 24 may execute the travelling control of the own automobile such that the own automobile travels according to the course indicated in the latest travelling control information, based on the latest travelling control information obtained.

Based on the obtained information, the travelling control ECU 24 generates the travelling control data to control the travelling of the automobile 7 and outputs the data to the driving ECU 21, the steering ECU 22, and the braking ECU 23. The driving ECU 21, the steering ECU 22, and the braking ECU 23 control the travelling of the automobile 7 according to the travelling control data inputted thereto.

In such a manner, each of the plurality of automobiles 7 controls its own travelling in accordance with its travelling control information received from the server devices 6. Thus, collisions and/or abnormal approaches between the plurality of automobiles 7 become difficult to occur.

On the other hand, if, for example, each of the plurality of automobiles 7 controls its own travelling individually, the possibility of occurrence of collisions and/or abnormal approaches between the plurality of vehicles 7 will increase due to, for example, different determinations made among the plurality of automobiles 7. In this case, it is difficult for each of the automobiles 7 to achieve a high level of safety and/or a sense of security, even if they are travelling under the automatic driving or the driving support. Even if the plurality of automobiles 7 inform their determination and/or content of travelling control to each other via the V2V communication, there is not a small possibility that the plurality of automobiles 7 approach each other or contact with each other in some cases at the merging section, etc. It is difficult to say that the travelling of vehicles such as the automobiles 7 will ensure sufficient safety. Further, the occupant(s) will feel anxiety about the approaching of other vehicles.

Figure 11A:
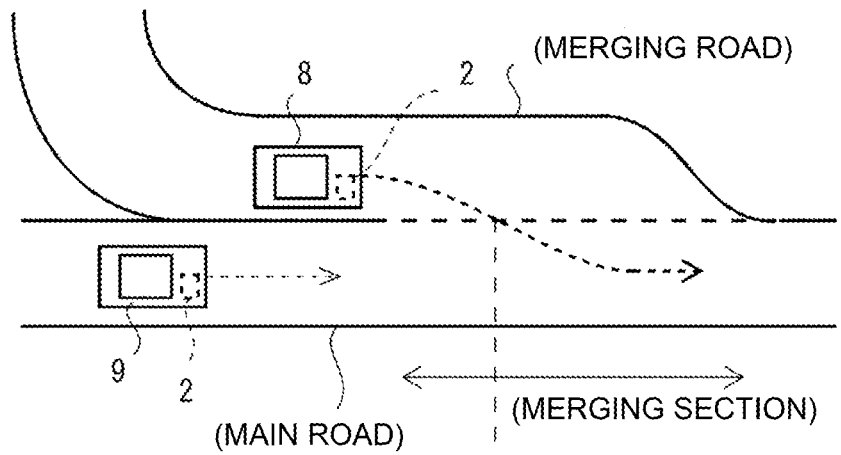
FIGS. 11A to 11C are explanatory diagrams of an example of a condition in which a first automobile is travelling on a merging road toward a main road.
Figure 11B:
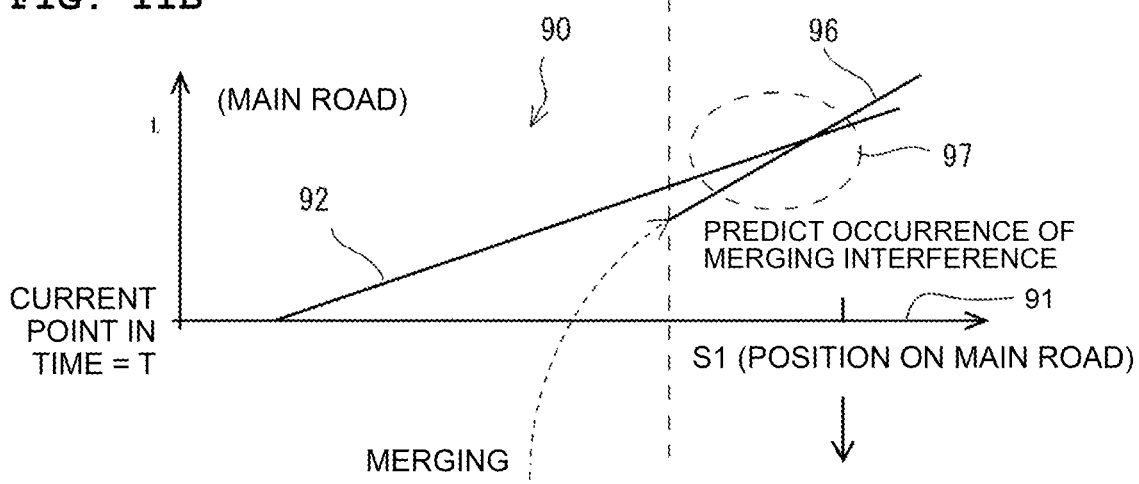
Figure 11C:
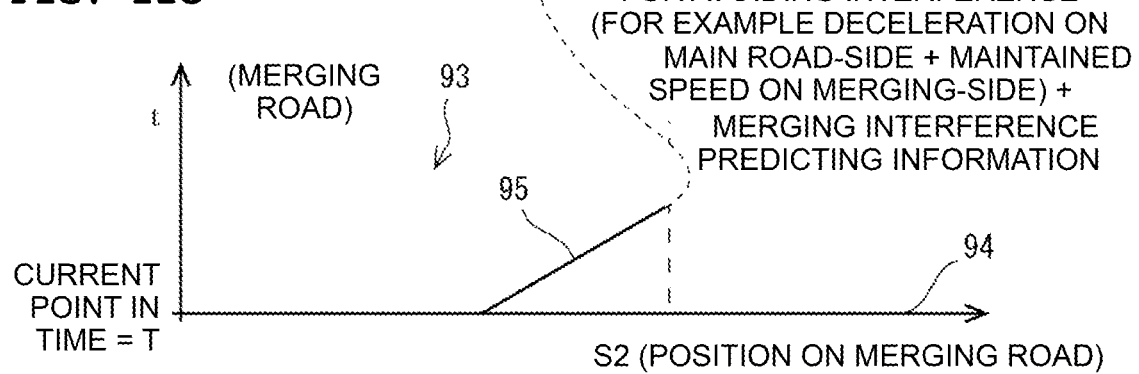

FIGS. 11A to 11C are explanatory diagrams of an example of a situation in which the first automobile 8 is travelling on the merging road toward the main road.

FIG. 11A depicts the main road having one lane and a branched road having one lane configured to merge into the main road. The branched road and the main road have a merging section where the branched road and the main road extend side by side.

The first automobile 8 travelling toward the merging section with the main road travels on the branched road. In this case, the first automobile 8 can merge into the main road by proceeding to the merging section on the branched road and changing lanes from the branched road to the main road at the merging section.

The second automobile 9 travelling toward the merging section with the branched road travels on the main road.

The first automobile 8 and the second automobile 9 may travel under the travelling control of the automatic driving or of the driving support using the travelling control information.

FIG. 11B is a current road map 90 of the main road generated by the server CPU 14 of the server device 6 in the step ST23 of FIG. 6.

In a case that the travelling condition at the current time T is the condition depicted in FIG. 11A, the second automobile 9 travelling on the main road toward the merging section is mapped onto the current road map 90 of the main road.

The second automobile 9 is mapped onto the current road map 90 of the main road by a trajectory 92 extending diagonally upward from a horizontal axis 91 that indicates the position on the main road at the current time T. Here, the trajectory corresponding to the second automobile 9 travelling at the current speed is depicted as the trajectory 92 of the second automobile 9. The trajectory 92 is a trajectory predicting the movement of the second automobile 9 by the travelling.

FIG. 11C is a current road map 93 of the branched road generated by the server CPU 14 of the server device 6 in the step ST23 of FIG. 6.

In a case that the travelling condition at the current time T is the condition depicted in FIG. 11A, the first automobile 8 travelling on the merging road toward the merging section is mapped onto the current road map 93 of the merging road.

The first automobile 8 is mapped onto the current road map 93 of the merging road by a trajectory 95 extending diagonally upward from a horizontal axis 94 that indicates the position on the merging road at the current time T. Here, the trajectory corresponding to the first automobile 8 travelling at the current speed is depicted as the trajectory 95 of the first automobile 8. The trajectory 95 is a trajectory predicting the movement of the first automobile 8 on the merging road by the travelling.

Further, the first automobile 8 is travelling from the branched road toward the main road. Therefore, the latter part of the trajectory 96 of the first automobile 8 is mapped onto the current road map 90 of the main road of FIG. 11B. On the current road map 93 of the merging road of FIG. 11C, the former part of the trajectory 95 of the first automobile 8 is solely mapped. The trajectory 95 and the trajectory 96 of the first automobile 8 are mapped separately onto the current road map 93 of the merging road of FIG. 11C and on the current road map 90 of the main road of FIG. 11B.

In the current road map 90 of the main road of FIG. 11B, the trajectory 96 of the first automobile 8 after merged onto the main road and the trajectory 92 of the second automobile 9 travelling on the main road toward the merging section intersect because the travelling speed of the second automobile 9 is faster than the travelling speed of the first automobile 8.

In this case, the server CPU 14 of the server device 6 predicts, in the step ST24 of FIG. 6, that the merging interfere will occur between the first automobile 8 and the second automobile 9 in a positional range 97, based on the current road map 90 of the main road of FIG. 11B.

Note that, in a case that the plurality of automobiles 7 approach each other such that the distance between the automobiles 7 is not more than a predetermined distance, the server CPU 14 may predict that the merging interfere will occur between the plurality of automobiles 7 even if the trajectories of the plurality of automobiles 7 does not intersect with each other.

In a case that the server CPU 14 predicts that the merging interference between the first automobile 8 and the second automobile 9 will occur, the server CPU 14 generates the travelling control information for the first automobile 8 and the travelling control information for the second automobile 9 to suppress the occurrence of the merging interference, in the step ST25 of FIG. 6.

The server CPU 14 generates, for the first automobile 8 merging into the main road at a position in front of the second automobile 9, the travelling control information for causing the first automobile 8 to travel toward the main road while maintaining the current speed for example.

Further, the server CPU 14 generates, for the second automobile 9 subject to the merging of the first automobile 8 into the position in front of the second automobile 9, the travelling control information for causing the second automobile 9 to decelerate even temporarily to a speed lower than the current speed, and to travel such that a space for the first automobile 8 merging into the main road is ensured, for example.

Preferably, the server CPU 14 may generate the travelling control information causing the second automobile 9 to ensure the following distance enough for the first automobile 8 to merge into the main road and travel at a lowered speed lower than the current speed of the first automobile 8.

Further, in a case that the server CPU 14 predicts the merging interference between the first automobile 8 and the second automobile 9, the server CPU 14 sends the merging interference predicting result together with the travelling control information to at least the first automobile 8 merging into the main road, among the first automobile 8 and the second automobile 9 for which the merging interference is predicted, at the step ST 34 of FIG. 8. The server CPU 14 may send the merging interference predicting result to both of the first automobile 8 and the second automobile 9 for which the merging interference is predicted, together with the travelling control information for each of them.

Figure 12A:
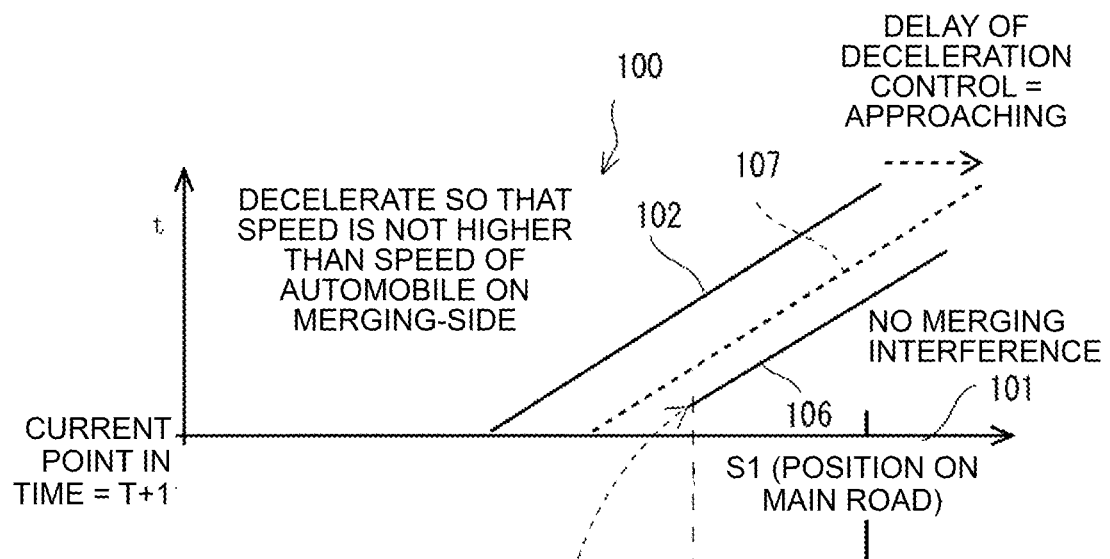
FIGS. 12A and 12B are explanatory diagrams of examples of current road maps at a timing directly after the timing of FIGS. 11A to 11C.
Figure 12B:
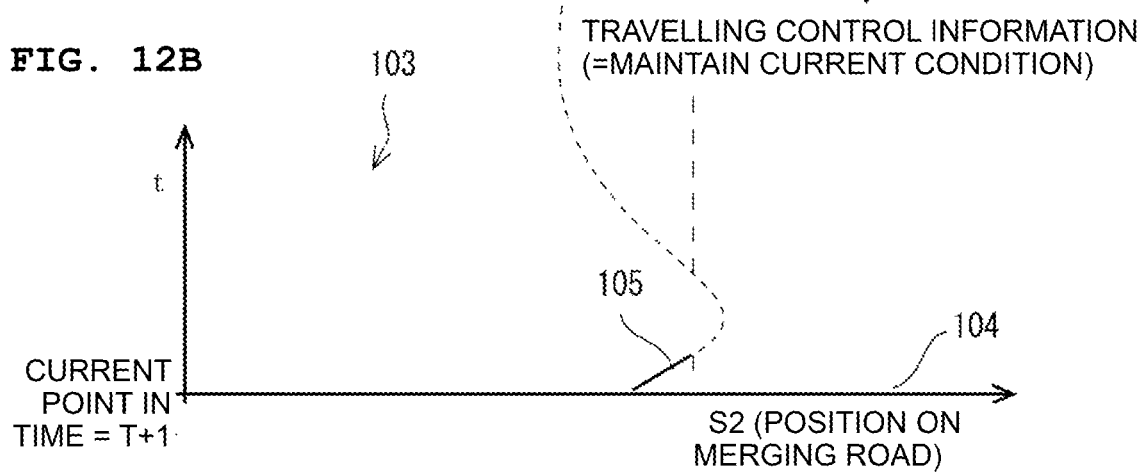

FIGS. 12A, 12B are explanatory diagrams of an example of a current road map immediately after FIGS. 11A to 11C.

FIG. 12A is a current road map 100 of the main road generated by the server CPU 14 of the server device 6 in the step ST23 of FIG. 6.

FIG. 12B is a current road map 103 of the merging road generated by the server CPU 14 of the server device 6 in the step ST23 of FIG. 6

The current road maps 100, 103 of FIG. 12A, 12B depict conditions at a time later than the current time of the current road maps 90, 93 of FIGS. 11B, 11C. Therefore, the current time of the current road maps 100, 103 of FIGS. 12A, 12B is (T+1).

Therefore, the position of the first automobile 8 on the merging road (the horizontal axis 104) at current time (T+1) is ahead in the travelling direction of the position at the current time T in FIG. 11C, as depicted in the current road map 103 of FIG. 12B. An inclination of a trajectory 105 of the first automobile 8 is the same as that in FIG. 11C. A latter part of a trajectory 106 of the first automobile 8 is mapped onto the current road map 100 of the main road of FIG. 12A.

The position on the main road (the horizontal axis 101) of the second automobile 9, to which deceleration is indicated by the travelling control information, at the current time (T+1) is ahead in the travelling direction of the position at the current time T in FIG. 11B, as depicted in the current road map 100 of FIG. 12A. However, because the second automobile 9 has decelerated, the inclination of a trajectory 102 shows an aspect corresponding to a speed lower than that of FIG. 11B. The inclination of the trajectory 102 of the second automobile 9 is approximately the same as the inclination of the trajectory 106 of the first automobile 8.

In this case, basically, the trajectory 106 of the first automobile 8 and the trajectory 102 of the second automobile 9 neither intersect nor approach each other on the current road map 100 of the main road of FIG. 12A. No merging interference between the first automobile 8 and the second automobile 9 is predicted.

As a result, the server CPU 14 basically generates, for both of the first automobile 8 and the second automobile 9, the travelling control information based on which the travelling under the current condition is maintained.

In such a manner, the first automobile 8 and the second automobile 9 can travel stably while avoiding or suppressing the merging interference, by executing the travelling control in accordance with the travelling control information generated based on the current road map.

However, as indicated by a dotted trajectory 107 in the current road map 100 of the main road of FIG. 12A, if there is a delay in a deceleration control of the second automobile 9, the trajectory 102 of the second automobile 9 approaches the trajectory 106 of the first automobile 8. This means that the second automobile 9 approaches the first automobile 8 on the main road.

If the distance between the second automobile 9 and the first automobile 8 becomes not more than a predetermined distance, the merging interference between the second automobile 9 and the first automobile 8 is not avoided or suppressed.

In this case, the server CPU 14 will generate the travelling control information for the first automobile 8 and the travelling control information for the second automobile 9 so as to suppress the merging interference, like the case of FIG. 11.

The server CPU 14 will generate, for example for the second automobile 9, for example the travelling control information based on which the second automobile 9 travels after decelerating to a speed further lower than the current speed. The speed of the second automobile 9 will be greatly reduced by continuous decelerating control. In a case that the second automobile 9 has already decelerated to a speed not higher than a speed of the first automobile 8, the second automobile 9 will travel in a state that it is excessively decelerated to a speed greatly lower than the speed of the first automobile 8. At least the second automobile 9 of the first automobile 8 and the second automobile 9 will change its speed greatly, and thus it is difficult to realize a stable travelling of the second automobile 9. The travelling of the second automobile 9 is difficult to be smooth and stable. The occupant of the second automobile 9 is likely to feel anxiety or displeasure about the travelling under the automatic driving or the driving support due to excessive speed changing.

In view of the above, in the first embodiment, in addition to the series of travelling control described above, the V2V communication (inter-vehicle communication) is executed between the first automobile 8 and the second automobile 9 for which the merging interference is predicted, and thereby suppresses fluctuation in the travelling caused by the control for suppressing the merging interference.

By doing so, excessive speed fluctuation becomes difficult to occur in the travelling of the first automobile 8 and the second automobile 9 for which the merging interference is predicted. The first automobile 8 and the second automobile 9 will be capable of travelling smoothly. The occupant will be difficult to feel anxiety or displeasure owing to the smooth travelling in which excessive speed fluctuation is suppressed.

Figure 13:
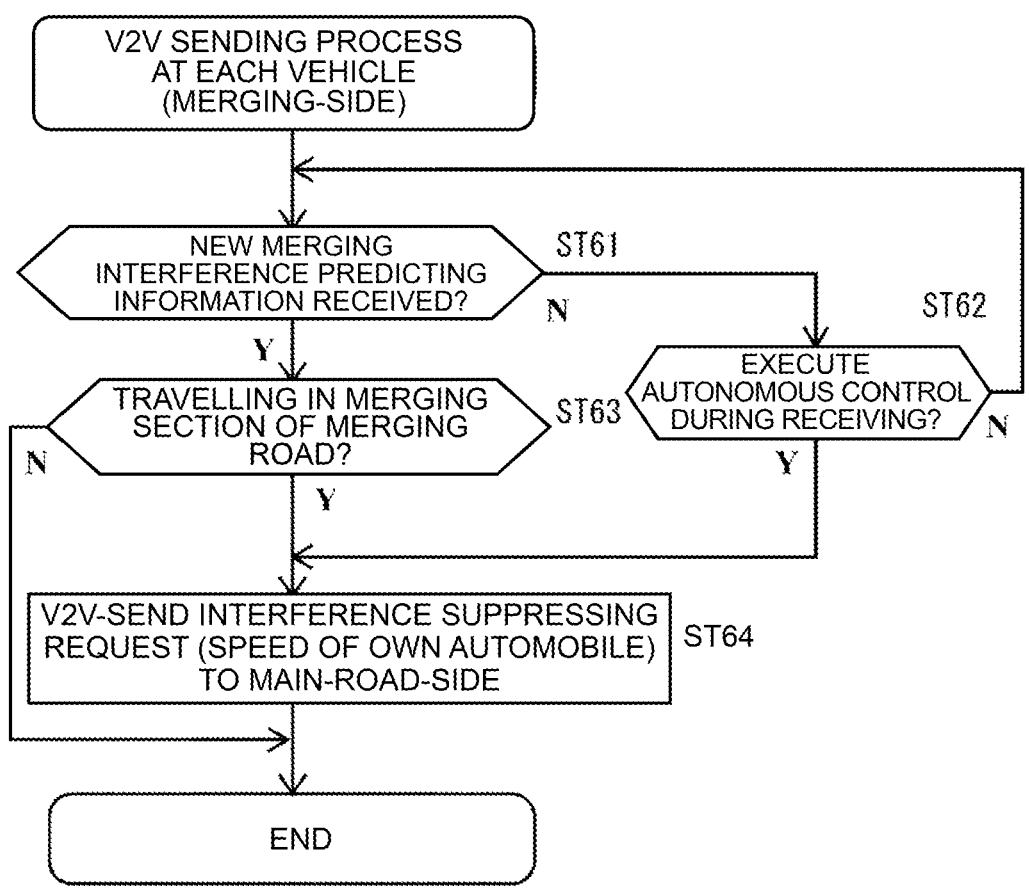
FIG. 13 is a flowchart of a V2V sending process executed by the first automobile on a merging-side travelling on the merging road toward the main road.

FIG. 13 is a flowchart of the V2V sending process executed by the first automobile 8 on the merging-side travelling on the merging road toward the main road.

One of the control ECUs of the vehicle system 2 of the first automobile 8 on the merging-side, for example the V2V communication ECU 28, may repeatedly execute the V2V sending process of FIG. 13. The V2V communication ECU 28 may execute the V2V sending process of FIG. 13 in the generating cycle of the travelling control information at the server device 6, for example.

In a plurality of automobiles 7 travelling based on the travelling control information, the V2V communication ECU 28 may repeatedly execute the V2V sending process of FIG. 13.

In a step ST61, the V2V communication ECU 28 on the merging-side determines whether or not the AP communication apparatus 70 of the own automobile has received a new merging interference predicting information (predicting information of merging interference). If the AP communication device 71 receives the new merging interference predicting information, the merging interference predicting information is recorded in the AP communication memory 72. The V2V communication ECU 28 may obtain, from the AP communication ECU 27, presence or absence of recording of the merging interference predicting information to the AP communication memory 72, and thereby determine whether or not new merging interference predicting information has been received or not.

In a case that the own automobile has not received the new merging interference predicting information, the V2V communication ECU 28 advances the process to a step ST62. In a case that the own automobile receives the new merging interference predicting information, the V2V communication ECU 28 advances the process to a step ST63.

In the step ST62, the V2V communication ECU 28 on the merging-side determines whether or not the travelling control ECU 24 is executing the autonomous travelling control not based on the travelling control information during a period of receiving the merging interference predicting information. The travelling control ECU 24 is required to execute the travelling control continuously even under a condition that the travelling control information cannot be received. Further, the travelling control ECU 24 is required to execute the travelling control depending on the situation even in a gap between one cycle and the next cycle of the receiving cycle of the travelling control information. In a case that those autonomous travelling controls are executed by the travelling control ECU 24 during the period of receiving the merging interference predicting information, the V2V communication ECU 28 on the merging-side advances the process to a step ST64. Otherwise, the V2V communication ECU 28 on the merging-side returns the process to the step ST61.

In the step ST63, the V2V communication ECU 28 on the merging-side determines whether or not the own automobile is travelling in the merging section of the merging road. In the automobile 7 travelling by the travelling control of the automatic driving or of the driving support, basically, information on a current position of the own automobile, and a road or a lane on which the own automobile is travelling is used based on the detecting information of the autonomous sensors. The V2V communication ECU 28 may obtains those pieces of information from the travelling control ECU 24, and determine whether or not the own automobile is travelling in the merging section of the merging road. If the own automobile is not travelling in the merging section of the merging road, the V2V communication ECU 28 terminates the process. If the own automobile is travelling in the merging section of the merging road, the V2V communication ECU 28 advances the process to a step ST64.

In the step ST64, the V2V communication ECU 28 on the merging-side functions as the sending unit (sender) so as to V2V-send a request about suppressing the merging interference to other automobile(s) on the main-lane-side travelling in the merging section of the main road, especially to other automobile(s) on the main-line-side travelling behind the own automobile. The V2V communication device 41 identifies the V2V communication apparatus 40 to become a counterpart of the V2V communication, and sends an interference suppressing request to the identified V2V communication apparatus 40. In a case that the V2V communication ECU 28 obtains the merging interference predicting result related to the travelling of the own automobile from the merging road to the main road from the server device 6 together with the travelling control information, the V2V communication ECU 28 functions as the sending unit so as to send the request for suppressing the interference to other automobile(s) travelling on the main road with which the merging interference will occur. In FIG. 11 the V2V communication ECU 28 of the first automobile 8 on the merging-side will send the interference suppressing request to the V2V communication apparatus 40 of the second automobile 9. After that, the V2V communication ECU 28 terminates the process.

Here, it is preferable that the interference suppressing request includes, at least information indicating a speed of the own automobile or a speed not higher than the speed of the own automobile. Other than that, the interference suppressing request may include, sending source information, sending destination information, current position information of the own automobile, merging position information of a position merging at which is intended, merging timing information, information of the merging objective lane, etc. These pieces of information are information that can be used in the travelling control for suppressing the merging interference in other automobile(s) that has received the interference suppressing request.

Figure 14:
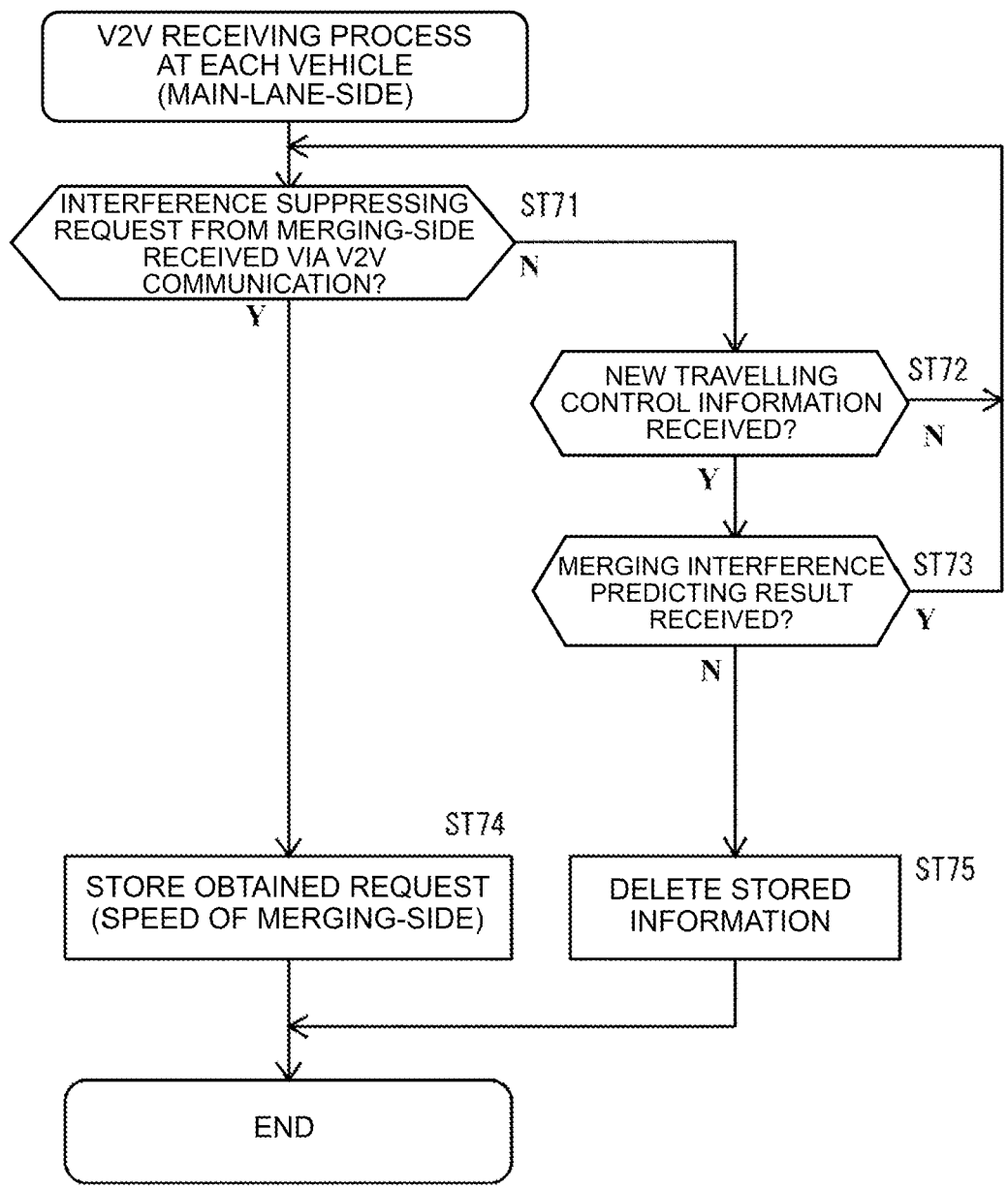
FIG. 14 is a flowchart of a V2V receiving process executed by the second vehicle on the main-lane-side travelling on the main road toward the merging section.

FIG. 14 is a flowchart of a V2V receiving process performed by the second automobile 9 on the main-line-side travelling on the main road toward the merge section.

One of the control ECUs of the vehicle system 2 of the second automobile 9 on the main-line-side, for example the V2V communication ECU 28, may repeatedly execute the V2V receiving process of FIG. 14. The V2V communication ECU 28 may execute the V2V receiving process of FIG. 14 in the generating cycle of the travelling control information at the server device 6, for example.

In a plurality of automobiles 7 travelling based on the travelling control information, the V2V communication ECU 28 may repeatedly execute the V2V receiving process of FIG. 14.

In a step ST71, the V2V communication ECU 28 on the main-line-side, functions as the receiving unit (receiver) so as to determine whether or not the interference suppressing request has been received via the V2V communication. In a case that the V2V communication device 41 on the merging-side sends the interference suppressing request, the V2V communication device 41 on the main-lane-side receives the sent request. The V2V communication device 41 on the main-lane-side may receive the request addressed to the own automobile among the interference suppressing requests sent from the V2V communication device 41 on the merging-side. By doing so, the first automobile 8 and the second automobile 9 can send and receive the interference suppressing requests via the V2V communication. In a case that the interference suppressing request has not been received, the V2V communication ECU 28 advances the process to a step ST72. In a case that the interference suppressing request has been received, the V2V communication ECU 28 advances the process to a step ST74.

In the step ST72, the V2V communication ECU 28 on the main-lane-side determines whether or not new travelling control information has been received from the server device 6. In a case that no new travelling control information has been received, the V2V communication ECU 28 returns the process to the step ST71. In a case that new travelling control information has been received, the V2V communication ECU 28 advances the process to a step ST73.

In the step ST73, the V2V communication ECU 28 on the main-lane-side determines whether or not a merging interference predicting result has been received together with new travelling control information from the server device 6. In a case that the merging interference predicting result has been received, the V2V communication ECU 28 returns the process to the step ST71. In a case that the merging interference predicting result has not been received, the V2V communication ECU 28 advances the process to a step ST75.

The step ST74 is a process executed in a case that the interference suppressing request has been received via the V2V communication. The V2V communication ECU 28 stores the received interference suppressing request in the V2V communication memory 42. Thereby, the information indicating the speed of the first automobile 8 on the merging-side or the speed not higher than the speed of the first automobile 8 that is sent, as the interference suppressing request, from the V2V communication ECU 28 on the merging-side is recorded in the V2V communication memory 42.

The step ST75 is the process performed in a case that receiving of new interference suppressing request via the V2V communication has stopped. The V2V communication ECU 28 deletes the interference suppressing request stored in the V2V communication memory 42.

In the vehicle system 2 of the second automobile 9 on the main-lane-side travelling on the main road toward the merging section, the V2V communication ECU 28 executes the process of receiving the interference suppressing request via the V2V communication as described above, as well as the driving control ECU 24 executes the travelling control of the own automobile by the automatic driving control of FIG. 10.

In a step ST54 of FIG. 10, the travelling control ECU 24 determines whether or not the interference suppressing request has been received via the V2V communication. In a case that the interference suppressing request has not been received, the travelling control ECU 24 advances the process to a step ST55. In a case that the interference suppressing request has been received, the travelling control ECU 24 advances the process to a step ST56.

The step ST55 is the travelling control of the own automobile executed in a case that no interference suppressing request has been received via the V2V communication. For example, if sensing results of the autonomous sensors indicate no problem about the travelling condition of the own automobile, the travelling control ECU 24 executes control of causing the own automobile to travel basically following the travelling control information, by using the latest travelling control information obtained from the server device 6. For example, if the travelling control information involves deceleration, the travelling control ECU 24 can execute the travelling control of causing the own automobile to decelerate, based on the merging interference predicting result for example, in the server device 6.

The step ST56 is the travelling control of the own automobile executed in a case that the interference suppressing request has been received via the V2V communication. In this case, the travelling control ECU 24 executes the travelling control in accordance with the interference suppressing request within the travelable range based on the travelling control information obtained from the server device 6. For example, in a case that the speed of the first automobile 8 included in the interference suppressing request is lower than the speed based on the travelling control information, the travelling control ECU 24 executes the travelling control so as to decelerate the speed of the own automobile to be not higher than the speed of the first automobile 8.

Further, the travelling control ECU 24 continues to execute the travelling control of decelerating the speed of the own automobile to be not higher than the speed of the first automobile 8 until the interference suppressing request is deleted from the V2V communication memory 42.

By doing so, the second automobile 9 on the main-lane-side travelling on the main road toward the merging section can execute the interference suppressing control of suppressing the approach of the second automobile 9 to the first automobile 8 on the merging-side travelling from the merging road toward the main road, in a case that the interference suppressing request is received from the first automobile 8 on the merging-side.

Thereafter, in a case that the interference suppression request is deleted from the V2V communication memory 42, the travelling control ECU 24 determines that the interference suppressing request has not been received in the step ST54, and executes the travelling control in accordance with the travelling control information of the step ST55.

Figure 15A:
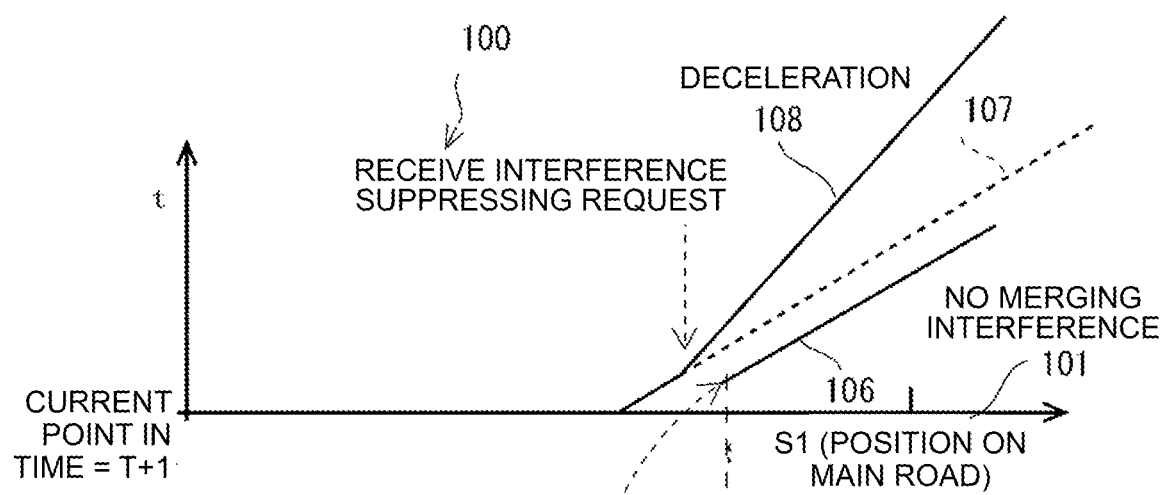
FIGS. 15A and 15B are explanatory diagrams of examples of the current road maps replacing FIGS. 12A and 12B, in a case that an interference suppressing request is received via the V2V communication.
Figure 15B:
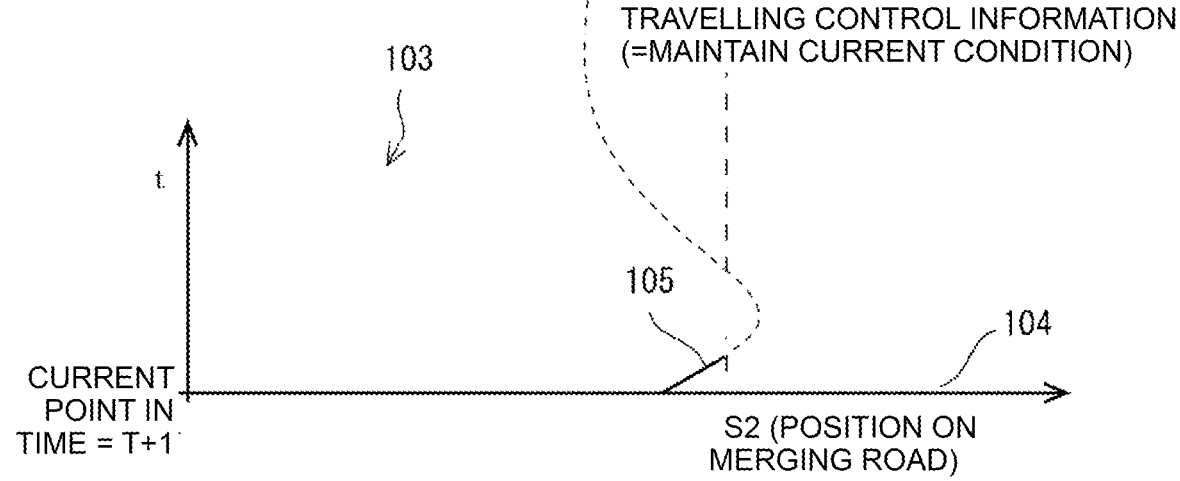

FIGS. 15A and 15B are explanatory diagrams of examples of current road maps, replacing FIGS. 12A and 12B, depicting a case where the interference suppressing request is sent and received via the V2V communication.

FIG. 15A is a current road map 100 of the main road replacing FIG. 12A.

FIG. 15B is a current road map 103 of the merging road replacing FIG. 12B.

The first automobile 8 sends the interference suppressing request to the second automobile 9 via the V2V communication, and the second automobile 9 receives the interference suppressing request.

The second automobile 9 that has received the interference suppressing request stores the received interference suppressing request. Further, based on the receiving of the interference suppressing request, the travelling control ECU 24 of the second automobile 9 executes the travelling control of decelerating the speed of the own automobile to be not higher than the speed of the first automobile 8.

As a result, in the current road map 100 of the main road of FIG. 15A, the trajectory 108 of the second automobile 9 bends at a timing of receiving of the interference suppressing request, and has an inclination indicating greater deceleration after the timing of receiving of the interference suppressing request.

The trajectory 108 of the second automobile 9 becomes difficult to approach the trajectory 106 of the first automobile

8, despite the control delay is occurred like the trajectory 107 depicted by the dotted line in FIG. 12A.

Further, the server CPU 14 no longer predicts the merging interference with respect to the second automobile 9 and the first automobile 8.

As described above, in the first embodiment, the server CPU 14 as the generating unit (generator) of the server device 6 generates the travelling control information for the plurality of automobile 7 and sends the generated information to the plurality of automobiles 7. Then, the plurality of automobiles 7, each of which is capable of executing the travelling control of the automatic driving or of the driving support in a case that travelling on a road, executes the travelling control in their respective vehicle systems 2, by using the travelling control information. By managing the travelling of the plurality of automobiles 7 based on the travelling control system 1 for the automobiles 7 such as above, the plurality of automobiles 7 can travel while ensuring principally a high level of safety and a sense of security.

Moreover, in the first embodiment, the server CPU 14 in the server device 6, rather than each of the plurality of automobile 7, functions as the predicting unit (predictor) so as to predict the merging interference between the first automobile 8 and the second automobile 9 among the plurality of automobile 7 travelling based on the travelling control by using the travelling control information, the first automobile 8 travelling from the merging road to the main road, the second automobile 9 travelling on the main road toward the merging section. Here, the server CPU 14 determines, as a merging interference, whether or not the first automobile 8 and the second automobile 9, each maintaining the travelling under the current status, approach such that distance between the first automobile 8 and the second automobile 9 is not more than a predetermined distance.

Then, the server CPU 14 of the server device 6 sends the predicted merging interference to at least the first automobile 8 travelling from the merging road toward the main road. In a case that the first automobile 8 has received the merging interference predicting information with respect to the second automobile 9 (the predicting information of the merging interference with the second automobile 9) together with the travelling control information from the server device 6, the first automobile 8 sends the interference suppressing request to the second automobile 9 via the V2V communication. In a case that the second automobile 9 on the main-lane-side receives the interference suppressing request from the first automobile 8 on the merging-side, the second automobile 8 executes the interference suppression control of suppressing the approach of the second automobile 9 to the first automobile 8 travelling from the merging road toward the main line road.

By doing so, in the first embodiment, even if a situation under which the merging interference cannot sufficiently be avoided by the travelling control of the server device 6 of the travelling control system 1 for the automobile 7 may occur, the automobiles 7 actually merging are capable of executing direct communication therebetween so as to avoid the merging interference satisfactorily.

As described above, in the first embodiment, basic safety between vehicles, a sense of security etc. are ensured by the server device 6 of the travelling control system 1 for the automobile 7 managing travelling of the plurality of automobiles 7, and further the merging interference can be satisfactorily suppressed by executing the inter vehicle communication at the site where the automobiles 7 merge.

As a result, in the first embodiment, even in a case that the first automobile 8 travels from the merging road toward the main road based on the travelling control of the automatic driving or of the driving support and the second automobile 9 travels toward the merging section of the main road, it is possible to ensure a high level of safety and a sense of security etc. with respect to the travelling of those automobiles 7.

Especially, in the first embodiment, the sending unit (sender) of the first automobile 8 on the merging-side sends information indicating the speed not higher than the speed of the own automobile as the interference suppressing request, and the second automobile 9 on the main-lane-side controls the speed of the own automobile such that it is not higher than the speed relating the first automobile 8 received as the interference suppressing request. By doing so, the speed of the second automobile 9 travelling on the main road is likely to be controlled such that it is lower than the speed of the first automobile 8 travelling on the merging road. By controlling the speed of the second automobile 9 on the main-lane-side to the speed similar to the speed of the first automobile 8, it becomes easier for the first automobile 8 on the merging-side to merge from the merging road into the main road. Further after the merging of the first automobile 8 from the merging road into the main road, the space between the first automobile 8 merged into the main road and the second automobile 9 on the main road is less likely to become small. The occupant is less likely to feel anxious about the merging.

As described above, even in a case that the first automobile 8 travels from the merging road toward the main road based on the travelling control of the automatic driving or of the driving support and the second automobile 9 travels toward the merging section of the main road, the travelling control system 1 for the automobile 7 of the first embodiment is possible to increase safety and a sense of security etc. with respect to the travelling of those automobiles 7.

Second Embodiment

Next, the travelling control system of the automobile 7 according to a second embodiment of the invention will be described.

In the above embodiment, in a case that the predicting of the merging interference is determined in the server device 6, the first automobile 8 on the merging-side sends the interference suppressing request based on the notification, and the second automobile 9 on the main-lane-side executes control such that the speed of the second automobile 9 is in conformity with the speed of the first automobile 8 on the merging-side included in the interference suppressing request.

In this case, the first automobile 8 on the merging-side is capable of merging into the main road, while smoothly travelling from the merging road to the main road basically maintaining the speed of the own automobile with on acceleration and deceleration. The first automobile 8 on the merging-side is capable of merging into the main road while smoothly travelling from the merging road toward the main road maintaining the speed of the own automobile on the merging road with no acceleration and deceleration, in a case that the travelling control information sent from the server device 6 to the first automobile 8 on the merging-side is not adjusted based on the merging interference predicting result.

However, if the number of the automobiles travelling on the main road toward the merging section increases, especially if the situation in which a traffic jam has occurred at the merging section of the main road arises, it becomes difficult for the first automobile 8 on the merging-side to merge into the main road while maintaining the speed of the own automobile on the merging road with no acceleration and deceleration.

In a case that the first automobile 8 cannot execute the merging into the main road, the first automobile 8 on the merging-side will travel until the end part of the merging section of the merging road, and decelerates and stops at the end part of the merging section. The first automobile 8 which stops at the end part of the merging section may not be able to execute the merging into the main road, basically until the situation in which no second automobiles 9 exists on the main road is realized.

In the second embodiment, an example in which the automatic driving control of the first automobile 8 travelling on the merging road toward the main road is modified such that occurrence of dilemmatic situation as above may be suppressed.

In the description of the second embodiment, the configuration and the process having commonness with those in the first embodiment will be indicated by the reference signs same as those for the first embodiment, and description therefor will be omitted. In the following description, the difference relative to the first embodiment will be mainly described.

Figure 16:
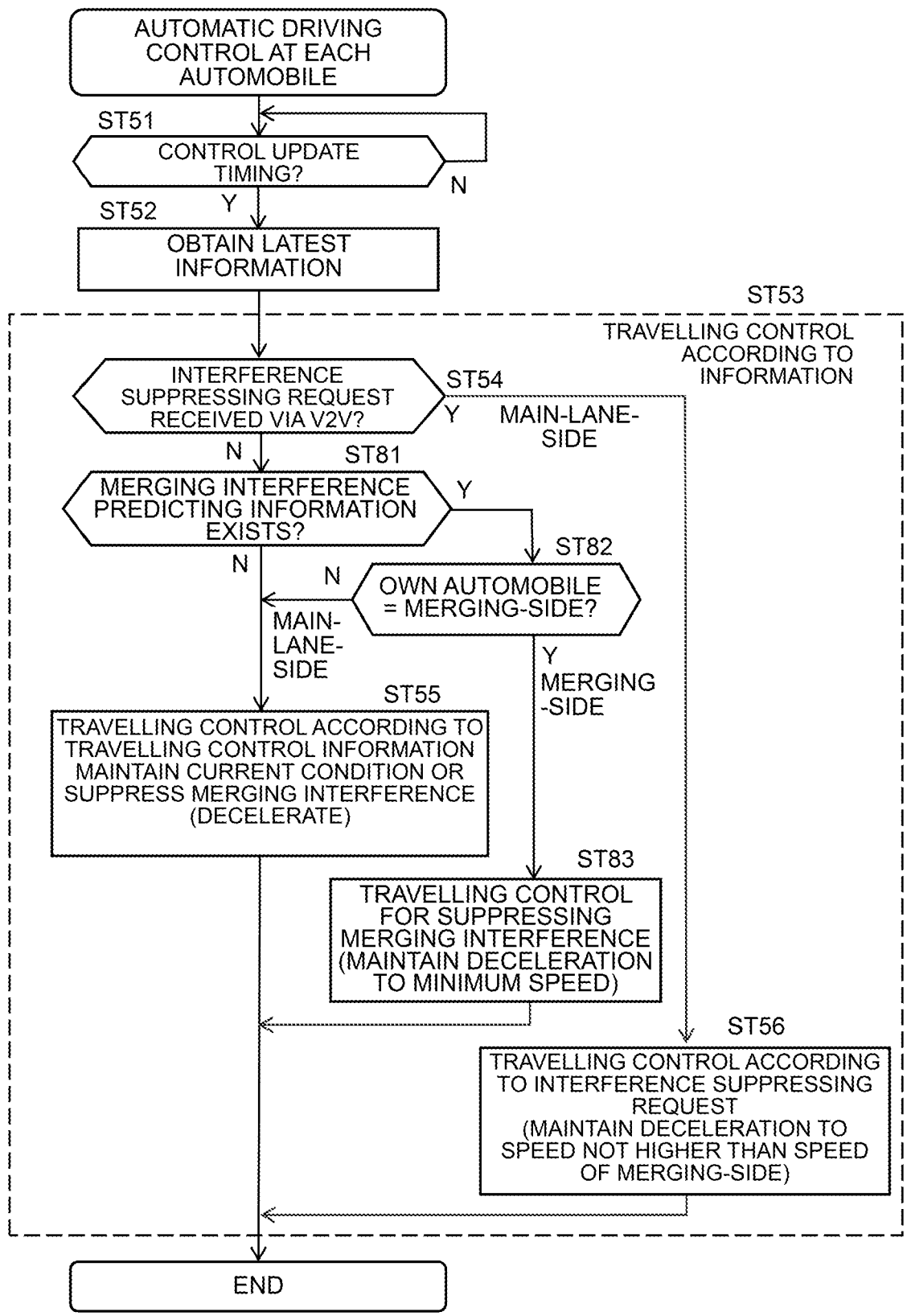
FIG. 16 is a flowchart of an automatic driving control executed by each of the plurality of automobiles in the second embodiment of the present invention.

FIG. 16 is a flowchart of the automatic driving control executed by each of the plurality of automobiles 7, in the second embodiment of the present invention.

In the vehicle system 2 of the automobile 7 of FIG. 3, for example the travelling control ECU 24 may execute the automatic driving control of FIG. 16. The travelling control ECU 24 may repeatedly execute the automatic driving control of FIG. 16 in the generating cycle of the travelling control information at the server device 6.

In the step ST54 of FIG. 16, the travelling control ECU 24 advances the process to a step ST81, in a case that the travelling control ECU 24 determines that no interference suppressing request has been received.

In the step ST81, the travelling control ECU 24 determines whether or not the merging interference predicting result has been received from the server device 6 together with the travelling control information. In a case that the merging interference predicting result has not been received, the travelling control ECU 24 advances the process to the step ST 55. In a case that the merging interference predicting result has been received, the travelling control ECU 24 advances the process to a step ST82.

In the step ST82, the travelling control ECU 24 determines whether the own automobile is on the merging-side or on the main-lane-side. In a case that the own automobile is not the merging-side but the main-lane-side, the travelling control ECU 24 advances the process to the step ST55. In a case that the own automobile is on the merging-side, the travelling control ECU 24 advances the process to a step ST83.

The step ST83 is travelling control of the own automobile executed in a case that the own automobile travels on the merging-side and the merging interference predicting result has been received from the server device 6 together with the travelling control information. The travelling control ECU 24 executes the travelling control for suppressing the merging interference based on the merging interference predicting result in the server device 6. For example, the travelling control ECU 24 executes the travelling control of decelerating the speed of the own automobile even if the travelling control information indicates to maintain the speed. The speed after deceleration by the control may be as low as possible compared to the speed limit, and may be minimum speed not zero. By continuing the travelling at the minimum speed, the own automobile on the merging-side can travel in the merging section taking as long time as possible, and it is expected that opportunity to travel so as to merge into the main road will increase.

For example, the first automobile 8 on the merging-side maintains the travelling at the low speed without stopping on the merging road, and then the first automobile 8 can merge smoothly into the main road by accelerating from the minimum speed.

Here, the minimum speed may be any speed higher than zero, at which the first automobile 8 maintains travelling on the merging road without stopping, at least. The minimum speed may be, for example, a speed fixed for each merging point, or a speed that varies depending on the travelling condition at the merging point. The minimum speed may be, specifically for example, a speed of the main road to which the merging is executed, for example a speed close to an average speed of the plurality of automobiles 7 on the main road, such that the merging thereafter will be executed smoothly. Other than that, for example, the minimum speed may be low speed about 5 to 20 km/h so as to make longer a period in which it is capable of maintaining the minimum speed. Note that the minimum speed may be varied within the range of those speeds depending on the condition related to a traffic jam or congestion of the main road to which the merging is executed. It is preferable to make the minimum speed of this case lower, in a case that the plurality of automobiles 7 continuously travels with small intervals on the main road as compared to a case that the plurality of automobiles 7 continuously travels with large intervals on the main road. Further it is preferable to make the minimum speed of this case lower, in a case that the plurality of automobiles 7 travels at minute speed or stops leaving no space between them on the main road as compared to a case that the plurality of automobiles 7 continuously travels with small intervals on the main road.

As described above, in the second embodiment, the first automobile 8 travelling on the merging road can execute the travelling in which the minimum speed is maintained on the merging road, in a case that the first automobile 8 has received the merging interference predicting information with respect to the second automobile 9 from the server device 6 together with the travelling control information, the minimum speed being higher than zero and as low as possible relative to the speed limit. Further, the automobile 8 travelling on the merging road continues to send the interference suppressing request to the second automobile 9 travelling on the main road at a position behind the first automobile 8 in the merging section in which the first automobile 8 is capable of travelling from the merging road to the main road.

By doing so, it is increased a possibility for the first automobile 8 travelling on the merging road that the first automobile 8 can merge into the main road in a period in which the first automobile 8 travels in the merging section of the merging road at the minimum speed slowly and without stopping. In a case that the second automobile 9 on the main-lane-side receives the interference suppressing request via the V2V communication, the second automobile 9 controls the travelling such that the second automobile 9 basically decelerates and widen the distance relative to the automobile travelling in front of the second automobile 9. Thus, it is increased a possibility for the first automobile 8 travelling on the merging road that the first automobile 8 can merge into the main road even if a traffic jam has occurred in the main road.

Further, because the first automobile 8 merges into the main road maintaining at least the minimum speed higher than zero, the second automobile 9 travelling on the main road also can maintain the travelling in which the speed higher than zero is maintained, without completely stopping at a position behind the first automobile 8 came into the main road.

In contrast, if the first automobile 8 stops on the merging road for example, the first automobile 9 in a stopped state cannot come into the main road until there is a break in the line of the automobiles 7 travelling on the main road. If the first automobile 8 merges into the main road while accelerating from the stopped state on the merging road, the second automobile 9 travelling on the main road and behind the first automobile 8 may be required to greatly decelerate or stop such that the second automobile 9 does not approach the first automobile 8 that has a low speed even after the acceleration. Those condition by which smooth travelling is hindered is difficult to occur in the second embodiment.

In the second embodiment such as described above, in a case that the predicting of the merging interference is determined in the server device 6, the first automobile 8 on the merging-side sends the interference suppressing request as well as decelerates based on the notification, and further, the second automobile 9 on the main-lane-side can execute the control such that the speed of the second automobile 9 is in conformity with the speed of the first automobile 8 on the merging-side included in the interference suppressing request.

In this case, the first automobile 8 on the merging-side can autonomously travel in the merging section of the merging road at low speed and taking long time, and concurrently the second automobile 9 on the main-lane-side makes its speed in conformity with the speed of the first automobile 8. By doing so, the first automobile 8 can merge into the main road while smoothly travelling from the merging road to the main road maintaining the travelling condition of the own automobile. The first automobile 8 on the merging-side can merge into the main road smoothly while maintaining the travelling condition of the own automobile even in a case that the travelling control information sent from the server device 6 to the first automobile 8 on the merging-side is not adjusted based on the merging interference predicting result such that the first automobile 8 travels in the merging section of the merging road at a low speed and taking long time.

In the second embodiment, it is possible to effectively suppress occurrence of the situation in which the first automobile 8 on the merging-side cannot merge into the main road due to a traffic jam in the main road etc., and as a result, the automobile 8 decelerates and stops at the end part of the merging section. It is possible to suppress occurrence of dilemmatic situation in which the first automobile 8 on the merging-side stops at the end part of the merging section and the first automobile 8 cannot execute the merging into the main road basically until the situation in which no second automobile 9 exists on the main road is realized.

Note that the merging interference suppressing request sent in a case that the traffic jam exists in the main road may include information on a cutting-in-area used for the merging of the first automobile 8 travelling on the merging road, the merging being executed by the first automobile 8 on the merging-side travelling on the merging road with respect to the second automobile 9 on the main-lane-side.

In a case that the second automobile 9 receives the information on the cutting-in-area, the travelling control ECU 24 of the second automobile 9 on the main-lane-side may control the travelling of the second automobile 9 such that the cutting-in-area required is ensured in a space between the second automobile 9 and another automobile 7 travelling in front thereof by decelerating or maintaining a stopped state.

In the second embodiment, the first automobile 8 on the merging-side, executes the travelling control such that the first automobile 8 autonomously travels in the merging section of the merging road at low speed and taking long time.

Other than above, for example, the server device 6 may generate the travelling control information based on which the first automobile 8 on the merging-side travels in the merging section of the merging road at low speed and taking long time, based on the determining result of the merging interference, and the first automobile 8 on the merging-side may execute the similar travelling control based on the instruction from the server device 6.

Third Embodiment

Next, the travelling control system 1 for the automobile 7 according to a third embodiment of the present invention will be described.

In the second embodiment described above, the first automobile 8 on the merging-side can travel in the merging section of the merging road at a low speed and taking long time, and a smooth merging is promoted by making a speed of the second automobile 9 on the main-lane-side in conformity with the speed of the first automobile 8 during a period in which the first automobile 8 travels at the low speed.

However, for example, such a situation may occur that a traffic jam has already occurred in the merging section of the main road when the first automobile 8 attempts to execute the merging into the main road. The traffic jam on the main road may be an aspect that the automobiles 7 travels very slowly without stopping.

In this case, there is a possibility that the first automobile 8 on the merging-side cannot execute the merging even if the first automobile 8 has decelerated to the minimum speed, and travels until the first automobile 8 reaches the end part of the merging section of the merging road.

Further, the first automobile 8 on the merging-side stopped at the end part of the merging section of the merging road then has to execute re-acceleration to merge into the main road. In a case that it is not possible to make the speed of the first automobile 8 in conformity with the speed of the automobiles 7 in the traffic jam in the main road, the first automobile 8 on the merging-side results in kept stopped.

In the third embodiment, an example in which the automatic driving control of the first automobile 8 travelling on the merging road toward the main road is modified so that the merging as smooth as possible may be realized even when the traffic jam exists in the main road.

In the description of the third embodiment, the configuration and the process having commonness with those in the first and second embodiments will be indicated by the reference signs same as those for the first and second embodiments, and description therefor will be omitted. In the following description, the difference relative to the first and second embodiments will be mainly described.

Figure 17:
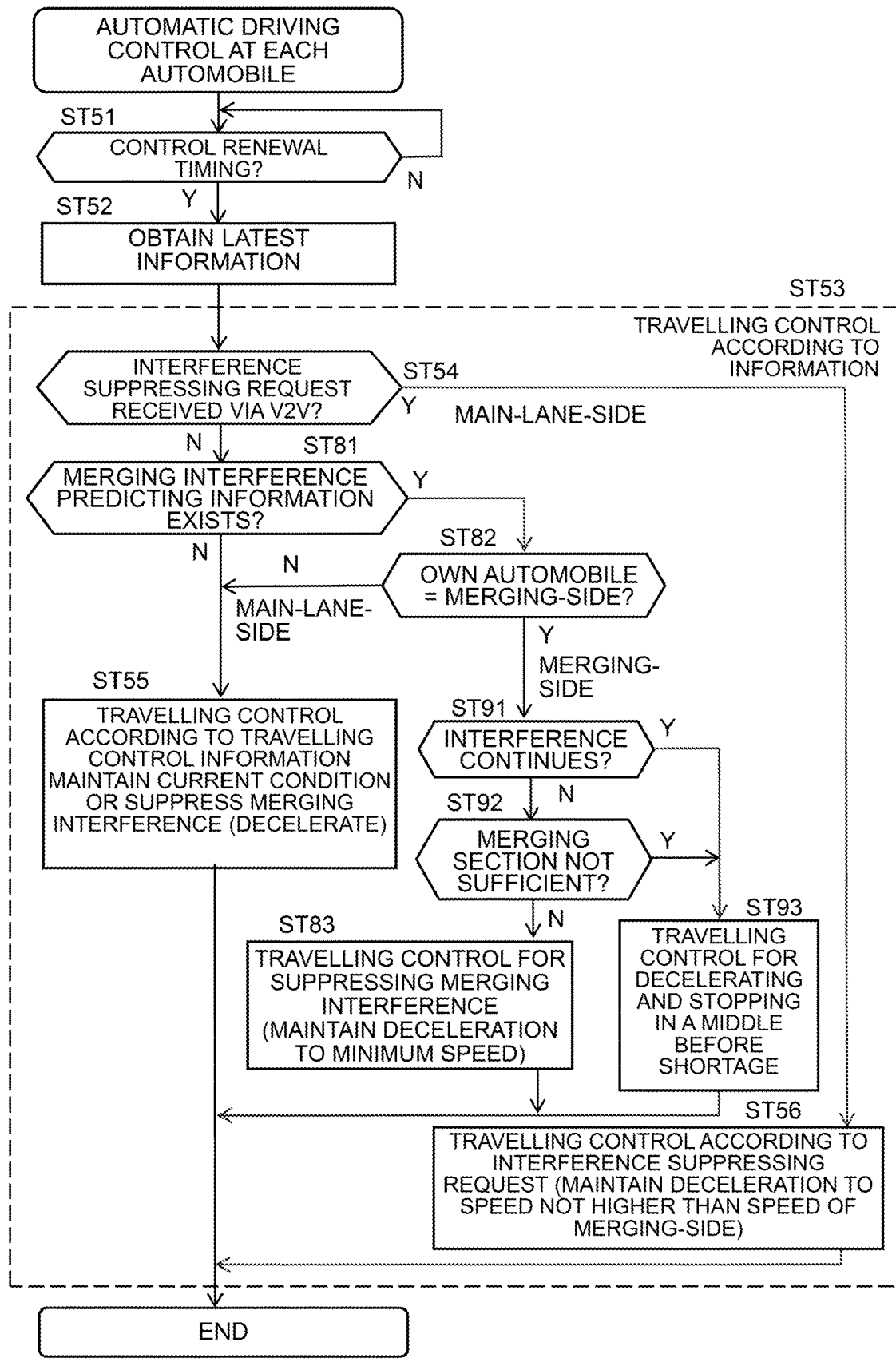
FIG. 17 is a flowchart of an automatic driving control executed by each of the plurality of automobiles in the third embodiment of the present invention.

FIG. 17 is a flowchart of the automatic driving control executed by each of the plurality of automobiles 7, in the third embodiment of the present invention.

In the vehicle system 2 of the automobile 7 of FIG. 3, for example the travelling control ECU 24 may execute the automatic driving control of FIG. 17. The travelling control ECU 24 may repeatedly execute the automatic driving control of FIG. 17 in the generating cycle of the travelling control information at the server device 6.

In the step ST82 of FIG. 17, the travelling control ECU 24 advances the process to a step ST91, in a case that the own automobile 9 is on the merging-side.

In the step ST91, the travelling control ECU 24 determines whether or not the merging interference predicting results are continuously received from the server device 6. The travelling control ECU 24 may determine whether or not the merging interference predicting results are continuously received from the server device 6 in the merging section of the merging road. Then, in a case that, for example, the merging interference predicting results from the server device 6 has been continuously received for a predetermined plurality of times being not less than two, the travelling control ECU 24 advances the process to a step ST93. Unless, the travelling control ECU 24 advances the process to a step ST92.

In the step ST92, the travelling control ECU 24 determines whether or not a shortage of the merging section of the merging road on which the own automobile travels will occur. The travelling control ECU 24 may determine whether or not the shortage of the merging section will occur based on, for example, whether or not the first automobile 8 decelerating from the current point in time can stop within the remaining merging section. In a case that the shortage of the merging section will not occur, the travelling control ECU 24 advances the process to the step ST83. In a case that the shortage of the merging section will occur, the travelling control ECU 24 advances the process to a step ST 93.

The step ST93 is the travelling control of the own automobile executed in a case that the own automobile continues to travel in the merging section of the merging road. The travelling control ECU 24 executes the travelling control based on which the own automobile decelerates and stops in the middle of the merging section before the shortage of the merging section of the merging road occurs.

By doing so, the first automobile 8 travelling on the merging-side can stop in the middle of the merging section of the merging road, before being caused to stop at the end part of the merging section of the merging road.

A re-acceleration section in which the first automobile 8 can accelerate appropriately is remained in front of the stopped first automobile 8 on the merging-side.

The automobile 8 on the merging-side can merge into the main road in which the traffic jam exists by performing re-acceleration to, for example, a speed of the automobiles 7 in the traffic jam in the main road by using the re-acceleration section remained, even in a case that the traffic jam with slow travelling exists in the main road.

As described above, in the third embodiment, the first automobile 8 on the merging-side travelling in the merging section of the merging road can decelerate and stop in the middle of merging section, before the shortage of the merging section of the merging road occurs, in a following case. That is, in a case that the interference suppressing request is sent from the first automobile 8 to the second automobile 9 based on the obtaining of the first merging interference predicting result, and then the first automobile 8 continues to receiving the further merging interference predicting information with respect to the second automobile 9 from the server device 6 while not being able to execute the merging. In other words, in a case that the first automobile 8 continuously receives the merging interference predicting information with respect to the second automobile 9 from the server device 6 for a plurality of times. By doing so, the first automobile 8 on the merging-side travelling in the merging section of the merging road can merge into the main road smoothly by for example accelerating to the speed of the automobiles 7 in the traffic jam in the main road using the re-acceleration section remained after the stopping, even if it is not possible to smoothly merge into the main road while maintaining the speed at the merging road. The occupant of the first automobile 8 is less likely to feel anxiety about not being able to execute the merging.

In the third embodiment, the first automobile 8 on the merging side executes the travelling control based on which the first automobile 8 autonomously decelerates and stops in the middle of the merging section, in a case that the first automobile 8 continuously receives the merging interference predicting results a plurality of times from the server device 6 during a period in which the first automobile 8 travels in the merging section of the merging road at a low speed and taking long time, or in a case that the shortage of the merging section of the merging road occurs.

Other than that, for example, the server device 6 may generate, based on the merging interference determining result, the travelling control information such that the first automobile 8 on the merging-side travels in the merging section of the merging road at a low speed and taking long time, and then may determine the continuous number of times of the receiving of the merging interference predicting results or the shortage of the merging section of the merging road, and may generate the travelling control information for causing the first automobile 8 to decelerate and stop in the middle of the merging section of the merging road in a case that the predicting continues or the shortage of the merging section occurs. Even in this case, the first automobile 8 on the merging-side can decelerate and stop in the middle of the merging section of the merging road, and can merge into the main road smoothly by accelerating to, for example, the speed of the automobiles 7 in the traffic jam in the main road by using the re-acceleration section remained after the stopping.

The embodiments described above are examples of suitable embodiments of the present invention. However, the present invention is not limited to those embodiments, and various deformation and modification is possible within a range not deviating from gist of the invention.

In the embodiments described above, the first automobile 8 on the merging-side and the second automobile 9 on the main-lane-side send and receive the interference suppressing requests directly via the V2V communication.

Other than that, for example, the first automobile 8 on the merging-side and the second automobile 9 on the main-lane-side may send and receive the interference suppressing requests via the V2V communication by way of a third automobile. Even if the third automobile is a large vehicle, the first automobile 8 on the merging-side and the second automobile 9 on the main-lane-side can send and receive the interference suppressing requests appropriately.

Further, other than the above for example, the first automobile 8 on the merging-side and the second automobile 9 on the main-lane-side may send and receive the interference suppressing requests by way of the wireless base station 4 as an advanced form of the V2V communication. By the transmission through the wireless base station 4, the first automobile 8 on the merging-side and the second automobile 9 on the main-lane-side can send and receive the interference suppressing requests appropriately, even in a case that good line-of-sight communication is not possible due to the intervention of obstructions such as buildings. Such a wireless base station 4 may, for example, be installed near the merging section between the merging road and the main road.

In either case, the first automobile 8 on the merging-side and the second automobile 9 on the main-line-side can send and receive the interference suppressing requests without transmitting through the server device 6, and thus it is possible to suppress occurrence of a delay in the sending and receiving of interference suppressing requests.

In the embodiments described above, the predicting of the merging interference is performed only in the server device 6.

Other than that, for example, the predicting of the merging interference may be performed redundantly in the vehicle system 2 of each of the automobiles 7 as well as in the server device 6.

REFERENCE SIGNS LIST

1: travelling control system
2: vehicle system
3: managing system
4: wireless base station
5: communication network
6: server device
7: automobile (vehicle)
8: first automobile
9: second automobile
11: server communication device
12: server GNSS receiver
13: server memory
14: server CPU
15: server bus
21: driving ECU
22: steering ECU
23: braking ECU
24: travelling control ECU
25: driving operation ECU
26: detecting ECU
27: AP communication ECU
28: V2V communication ECU
30: automobile network
31: bus cable
32: central gateway
40: V2V communication apparatus (inter vehicle communication apparatus)
41: V2V communication device
42: V2V communication memory
51: steering wheel
52: brake pedal
53: accelerator pedal
54: shift lever
61: speed sensor
62: acceleration sensor
63: stereo camera
64: LIDAR
65: 360 degrees camera
66: GNSS receiver
70: AP communication apparatus
71: AP communication device
72: AP communication memory
79: control memory
80, 90, 93, 100, 103: current road map
81, 91, 94, 101, 104: horizontal axis
82, 83, 84, 92, 95, 96, 102, 105, 106, 107, 108: trajectory
85: decelerating stopping section
97: positional range
110: GNSS satellites

The invention claimed is:

1. A travelling control system for vehicles comprising:
a plurality of vehicles each including a controller configured to execute travelling control of an automatic drive or of a driving support in a case that the plurality of vehicles travels on a road;
a server including a generator configured to generate a travelling control information for the plurality of vehicles;
a predictor which is provided in the server and which is configured to predict a merging interference between a first vehicle, of the plurality of vehicles, travelling from a merging road toward a main road and a second vehicle, of the plurality of vehicles, travelling on the main road;
a sender which is provided in the first vehicle travelling on the merging road and which is configured to send an interference suppressing request to the second vehicle travelling on the main road in a case that the first vehicle has received predicting information of the merging interference with the second vehicle from the server; and
a receiver which is provided in the second vehicle travelling on the main road and which is configured to receive the interference suppressing request from the first vehicle travelling on the merging road, wherein:
the travelling control system is configured to send the travelling control information generated by the generator of the server to the plurality of vehicles so as to cause the controller of each of the plurality of vehicles to execute a travelling control using the travelling control information; and
the controller of the second vehicle travelling on the main road is configured to execute interference suppressing control of suppressing an approach of the second vehicle to the first vehicle travelling from the merging road to the main road, in a case that the receiver receives the interference suppressing request from the first vehicle.

2. The travelling control system for vehicles according to claim 1, wherein the predictor of the server is configured to predict the merging interference between the first vehicle and the second vehicle by determining an approach of the first vehicle and the second vehicle making a distance between the first vehicle and the second vehicle not greater than a predetermined distance, as the merging interference between the first vehicle travelling from the merging road to the main road and the second vehicle travelling on the main road.

3. The travelling control system for vehicles according to claim 1, wherein, in a case that the predictor predicts the merging interference between the first vehicle travelling from the merging road to the main road and the second vehicle travelling on the main road, the generator of the server is configured to generate the travelling control information of decelerating, with respect to the second vehicle travelling on the main road.

4. The travelling control system for vehicles according to claim 1, wherein, in a case that the first vehicle has received the predicting information of the merging interference with the second vehicle from the server together with the travelling control information, the controller of the first vehicle travelling on the merging road is configured to execute travelling in which a minimum speed higher than zero is maintained on the merging road.

5. The travelling control system for vehicles according to claim 1, wherein the sender of the first vehicle travelling on the merging road is configured to send the interference suppressing request to the second vehicle travelling on the main road, in a merging section in which travelling from the merging road to the main road is possible.

6. The travelling control system for vehicles according to claim 1, wherein the sender of the first vehicle and the receiver of the second vehicle are configured to send and receive the interference suppressing request via an inter vehicle communication.

7. The travelling control system for vehicles according to claim 1, wherein:

the sender of the first vehicle is configured to send information indicating at least a speed not higher than a speed of the first vehicle, as the interference suppressing request; and the controller of the second vehicle is configured to control a speed of the second vehicle such that the speed of the second vehicle is not higher than the speed relating the first vehicle received by the receiver of the second vehicle as the interference suppressing request.

8. The travelling control system for vehicles according to claim 1, wherein, in a case that the controller of the first vehicle receives the predicting information of the merging interference with the second vehicle from the server a plurality of times, the controller of the first vehicle is configured to control travelling of the first vehicle such that the first vehicle stops in a middle of the merging road.

* * * * *